United States Patent [19]

Ferrara et al.

[11] Patent Number: 5,683,587
[45] Date of Patent: Nov. 4, 1997

[54] PROCESS FOR TREATING INDUSTRIAL WASTES

[76] Inventors: Marcello Ferrara; Maria Gabriella Scopelliti, both of via Marco Polo, 73, Messina, Italy, 98100

[21] Appl. No.: 580,487

[22] Filed: Dec. 29, 1995

Related U.S. Application Data

[63] Continuation of Ser. No. 142,463, filed as PCT/IT93/00026, Mar. 29, 1993, abandoned.

[30] Foreign Application Priority Data

| Mar. 30, 1992 | [IT] | Italy | ME92A0002 |
| May 27, 1992 | [IT] | Italy | ME92A0006 |
| Jun. 18, 1992 | [IT] | Italy | ME92A0007 |

[51] Int. Cl.⁶ ............................ C02F 11/14
[52] U.S. Cl. ............. 210/696; 95/232; 95/235; 95/236; 210/697; 210/698; 210/701; 210/710; 210/718; 210/750; 210/764; 210/919; 423/230; 423/239.1; 423/244.01; 423/DIG. 8
[58] Field of Search ............... 210/696–701, 210/702, 710, 714, 724, 718, 751, 752, 750, 764, 919; 95/235, 230, 232, 236; 423/213.2, 225, 230, 239.1, 244.01, DIG. 8

[56] References Cited

U.S. PATENT DOCUMENTS

| 1,964,487 | 6/1934 | Smith | 210/750 |
| 2,000,197 | 5/1935 | Smith | 210/764 |
| 2,262,301 | 11/1941 | Roller | 210/696 |
| 3,769,208 | 10/1973 | Cook et al. | 210/696 |
| 3,828,525 | 8/1974 | Copa et al. | 55/68 |
| 3,876,537 | 4/1975 | Dulin et al. | 210/751 |
| 4,000,991 | 1/1977 | Melin et al. | 210/696 |
| 4,017,391 | 4/1977 | Black | 423/164 |
| 4,059,513 | 11/1977 | Zadera | 210/234 |
| 4,085,194 | 4/1978 | Otani et al. | 95/235 |
| 4,123,355 | 10/1978 | Poradek et al. | 95/235 |
| 4,137,163 | 1/1979 | Young | 210/44 |
| 4,246,245 | 1/1981 | Abrams et al. | 423/242 |
| 4,532,047 | 7/1985 | Dubin | 210/698 |
| 4,634,533 | 1/1987 | Somerville | 210/737 |
| 4,756,888 | 7/1988 | Gallup et al. | 423/42 |
| 4,801,387 | 1/1989 | Chen | 210/699 |
| 4,834,955 | 5/1989 | Mouché et al. | 252/180 |
| 5,350,511 | 9/1994 | Sakurada | 210/199 |

*Primary Examiner*—Peter A. Hruskoci
*Attorney, Agent, or Firm*—Beveridge, DeGrandi, Weilacher & Young, LLP

[57] ABSTRACT

Water to be utilized is reacted with soda ash and lime to produce a less corrosive and foulant water. Reaction sludges are fed to a desulfurization unit, where $SO_x$, $NO_x$ and $CO_2$ abatement occurs; other industrial waste sludges and/or waters and/or gases can also be utilized in such connection. FIG. 1 is one of the possible process schemes of the present invention.

19 Claims, 1 Drawing Sheet

PROCESS FOR TREATING INDUSTRIAL WASTES

This application is a continuation of U.S. patent application Ser. No. 08/142,463, filed as PCT/IT93/00026 Mar. 29, 1993, which application is entirely incorporated herein by reference and is now abandoned.

The present invention relates to a process for reducing corrosion and fouling in seawater, cooling waters, process waters and permits the use of carbon steel in seawater utilization; the process is also applicable to well, river, lake, saline, brackish and waste waters. The same process is also useful in reducing $SO_x/NO_x/CO_2$—containing flue gas emissions and in reducing disposal problems of some industrial wastes.

Problems arising in seawater utilization in the industry are connected with corrosion, scale, fouling and biofouling. Corrosion is mainly caused by the action of dissolved oxygen, chlorides and sulfates. Scale arises from precipitation of seawater (SW) dissolved salts; to this is to be added fouling from corrosion products deposition. On fouling, plankton also plays a role, in that it deposits and attaches to metal surfaces in the form of "biological gelatine", such gelatine working as a binder of deposited materials. On the deposits, which adheres on metallic surfaces, come and install biofouling colonies, formed by superior marine animals that "live without moving" realizing there their entire living cycle. Among such organisms there are some that contribute to corrosion, specially if the surfaces are iron based. SW corrosion on carbon steel is high (10–50 mpy (1 mpy=0.0254 mm/year), and even 150–200 mpy in still SW), and it is then mandatory to use costly metallurgies (generally the copper and titanium based ones) in the systems that make use of SW.

Nowadays no chemical corrosion inhibitor is utilized to combat SW corrosion on carbon steel: zinc and chromates, the actually most effective water corrosion inhibitors, would be too costly and not as effective as they are in ground waters; moreover, due to the excessive dosages to be employed, they would be in any case unacceptable from an environmental standpoint. The same for phosphorus based chemicals.

For biofouling control, chlorine is of normal use, but a chlorine residue of 0.2 ppm (legal limit e.g. in Italy) is not sufficient to the scope. Sometimes even chlorine residues of 2 ppm are non effective, e.g. in SW cooling towers, against all forms of marine life.

Scale and fouling control are achieved limiting seawater the possibility to concentrate over a certain amount. As a matter of fact SW is normally utilized in once-through systems, in which SW has a huge volume; there are a few systems which recycle SW in cooling towers, mainly to avoid an out of specification discharge temperature (typical concentration numbers for seawater in cooling tower applications are 1.1–1.2). No chemical means are used in once-through SW cooling towers to combat scale and fouling, as this would be too costly and of minor efficiency.

A common feature of all SW cooling systems is that they utilize costly metallurgies (generally the copper based ones, like admiralty, cupro-nickel, aluminium brass) to face the huge corrosion problems that would arise with the more low cost metallurgies (e.g. carbon steel).

The same with SW distillation desalination plants (e.g. MSF). In SW evaporators, due to process high temperatures, beyond the already cited corrosion and $CaCO_3$ deposition problems, $CaSO_4$ deposition must be taken into account (which forms a very hard deposit, difficult to remove). This all limits the overall system efficiency. In such desalination plants, pretreatment of SW begins with screening at the intake pit to remove debris. The SW is then acidified to neutralize the carbonates and bicarbonates prior to passing into a packing tower, where the combination of vacuum and stripping steam deaerates and removes the other noncondensable gases such as $CO_2$. An oxygen scavenger and caustic are added to the water out of the deaerator. Caustic is added to adjust pH after acid addition. To avoid acid addition a deposit control agent can be added. SW decarbonation can also be accomplished by aeration (eventually after acidification). Other softening methods include e.g. reverse osmosis, electrodialysis, ion exchange, ion selective membrane, d.c. potential application, etc.

In today's state of the art, besides that, not working sea-lines are SW filled to avoid corrosion. Such SW is therefore inhibited with an oxygen scavenger (150 ppm about) and filming biocides (e.g. 200 ppm of cetyltrimethylammonium bromide); this results in high costs (more than 2.1 $/m^3$ at today's prices) and environmental problems for treated water disposal. Speaking about static SW, SW firefighting systems suffer huge corrosion problems that may even endanger system security.

There are a number of chemical compositions in the art able to effectively treat waters but, to our knowledge, only few have been claimed to be effective in SW applications (some antiscale in MSF desalination plants), and none are effective in SW utilization in cooling towers.

In MgO or Mg production from seawater (SW), SW is first filtered to remove debris and then treated with little amounts of lime to precipitate bicarbonates as $CaCO_3$, which is separated from SW before reaction. Alternatively, SW is decarbonized by acid reaction (up to pH<4) and then degased to remove formed $CO_2$. Such treated SW is then reacted with CaO (up to pH>11) to precipitate Mg as $Mg(OH)_2$. In some cases NaOH is also added. The formed slurry is transferred to a decanter, where precipitate separates while exhausted SW overflows and after pH correction is disposed in the sea.

In today's state of the art, SW that has reacted with time and/or NaOH and from which has been precipitated mostly of present Mg has no further utilization and becomes a waste to dispose of.

In chlorine-caustic soda production by NaCl containing salts solution electrolysis, mercurous waters, after equalization and demercurization, are disposed following environmental regulations. Such waters are constituted by cells wash waters, straining waters from brine and apparatuses, condensed waters coming from ceils (which contain chlorine): they all came in contact with $Na_2CO_3$ and/or $Ca(OH)_2$ and/or NaOH and contain free chlorine, besides having pH>11 (11.7).

In today's state of the art such waters have no further utilization and become a waste to dispose of.

Other kinds of waste waters find no further application than disposal. Some attempt has been made concerning municipal waste water reuse as cooling tower make-up water but not all of them have been successful, as application problems depends on water characteristics.

In industrial processes, sludges produced during operation are today a major environmental problem in that most of them are disposed by discharge in controlled lands (landfilling).

In particular, such disposal is made for sludges from softening plants, chlorine-caustic plants, Mg/MgO plants, drilling operations, etc. Sludges are normally conditioned with organic flocculants, dewatered by centrifugation and/or filtration and landfilled after inertization. Disposal is then a costly operation and, in any case, is believed to be a big operational and environmental problem. Some sludges (e.g. drinking water purification sludges) are utilized in agriculture or in the manufacture of cement. Some processes for recovering chemicals (e.g. lime) from water treatment sludges are reported. Other water and wastewater sludge cakes reuse processes include: freeze-thaw method, sand-drying beds and carbon filtration-adsorption.

In the following description what is said for $SO_2$ can be extended to $SO_x$.

In today's state of the art, $SO_2$ emission can be controlled with various desulfurization processes, of which are of industrial interest those using sorbents like lime, limestone, MgO, Mg enhanced lime or limestone, seawater scrubbing. Sorbents can be injected as a slurry in an appropriate scrubber or directly in the boiler as a fine powder. Spray-towers (that are high liquid/gas ratio (L/G) scrubbers) can also be used. Typical sorbent ratio in spray-towers are 1.1–1.6 $Ca(OH)_2$ /$SO_2$ (1.1 if solid recycle is performed). Suitable flue gas desulfurization temperatures ranges from 110° to 130° C.

Desulfurization units can be composed of a prescrubber (which must guarantee a minimum 80% solid particulate abatement) and of a scrubber in which is injected sorbent slurry. In the prescrubber ashes and other pollutants are removed from flue gas, with the scope of ensuring required purity to commercial $CaSO_4$ and $Mg(OH)_2$, and is accomplished steam flue gas saturation and alogen adsorption.

When possible, SW can be utilized in the prescrubber, but a less pure $CaSO_4$ is obtained (due to chlorides presence); in such case the produced gypsum can be utilized in a housing, as road ground or in a landfill.

Magnesium enhanced lime profoundly alters $SO_2$ absorption chemistry. Mg increases slurry adsorption capacity, at least 10–15% more in comparison to that of lime alone. The main advantage is that $SO_2$ adsorption is governed by the degree of gas/liquid contact in the scrubber, not on solids dissolution, as it does with limestone systems. This enables the process to achieve high removal efficiencies at significantly lower L/G ratios. Also, the chemistry, specifically the higher operating pH, inhibits $CaSO_4$ formation so little scaling can occur. $Mg(OH)_2$ addition to lime or limestone units reduces oxidation and prevent scaling (allows the desulfurator to operate in undersaturation conditions with regard to $CaSO_4$ and scale is not formed in the scrubber), and notably increases $SO_2$ abatement.

Due to high sorbent amounts employed, technology costs are high and for the same reason transport problems arise.

In SW scrubbing, for $SO_2$ adsorption use made use of the natural alkalinity of SW. SW is transported in huge volumes, once-through, in a scrubber where it adsorbs $SO_2$. In such process a water pH lowering takes place, with consequent SW disposal problems. Adsorption efficiency only depends on SW volume. As a matter of fact, $SO_2$ reactions in SW are:

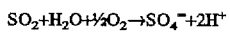
$SO_2+H_2O+\tfrac{1}{2}O_2 \rightarrow SO_4^- + 2H^+$

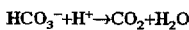
$HCO_3^- + H^+ \rightarrow CO_2 + H_2O$

$SO_2 + H_2O \rightarrow H^+ + HSO_3^- \rightarrow 2H^+ + SO_3^-$ in which reaction completion is favored by $H^+$ removal due to SW alkalinity and pH. High pH in fact favors $SO_2$ adsorption. Referring to $SO_2$ adsorption efficiency it is then evident that SW natural dissolved salts have a negligible impact —what $SO_2$ reactions concerns—in comparison to $SO_2$ water dissolution.

A desulfurization method well known in the art uses a lime or limestone water slurry. This is a widespread technology in the industry.

$NO_x$ removal is achieved, e.g., by thermal or selective non-catalytic reduction (SNR) processes, which rely on injecting ammonia, urea or other nitrogen-containing compounds into the flue gas in a temperature regime of 870°–1300° C. to reduce $NO_x$ to water and nitrogen. Catalysts can enhance $NO_x$ removal.

Few corrosion inhibitors are reported to effectively reduce seawater corrosion, and these relate to metallurgies different from carbon steel. A great number of corrosion inhibitors are reported to be effective on other types of water. EPA 451434 gives a list of commercial corrosion inhibitors and dispersants to be used in waters different from seawater.

FR 2,656,877 describes picolinic and isonicotinic acid inhibitors for Al and Al alloys in contact with Fe and Fe alloys in seawater. Benzotriazole, tolyltriazole, mercaptobenzothiazole and 2-(5-pentylamino)benzimidazole at concentrations of about 10 ppm effectively inhibit Cu corrosion in areated seawater (Chemical Abstracts 107:12568 g).

Pol. PL 124,465 reports corrosion prevention on surfaces in circulation cooling systems supplied with softened water; cooling systems using softened water are protected from corrosion by passivation and inhibition with $H_3PO_4$ esters, nonorganic/nonoxidizing chemicals, fatty acid surfactant and polyethylene oxide. Suitable mixtures for passivation and inhibition contain mixed esters of $H_3PO_4$ with triethanolamine and MeOH 250 and 25, $NaNO_2$ 500 and 50, fatty acid surfactant 250 and 25, and polyethylene oxide 20 and 20 mg/L respectively.

EPA 375,587 reports a method to prevent incrustation of the salts, as well as erosion and formation of microorganisms in an apparatus for distillation of SW. NaCl is added to SW for the purpose.

There are a number of deposit control agents reported to be effective on seawater. Polycarboxyl type antiscalants are reported to be effective in MSF desalination plants. Can. CA 1,158,595 describes an antiscalant for seawater evaporators made by an alkali metal or $NH_4^+$ salt of a 3–4:1 acrylic acid-Me acrylate copolymer having a molecular weight of 1000–3000.

There are a number of biofouling control agents reported to be effective on seawater. Seawater macrofouling is for example combated with butyltin compounds.

Concerning waste reuse, to our knowledge, few patents are issued in the field of the present invention. CN 1,041,340 describes a method for softening water by lime treatment including reclamation of sludge generated in the process with the steps of: mixing water with lime slurry at controlled concentration to precipitate $CaCO_3$ and separate $CaCO_3$ and water by overflowing water from the top of the reactor, filtering softened water and adjusting it to pH 7.5 for use, discharging the precipitated $CaCO_3$ from the reactor, draining the $CaCO_3$, decomposing the $CaCO_3$ in a rotary kiln and cooling the formed quicklime, and preparing the lime slurry from the quicklime for reuse.

It is also reported adipic acid byproducts utilization for enhancement of flue gas desulfurization.

U.S. Pat. No. 4,834,955 reports a composition for inhibiting corrosion and deposits in cooling towers and gypsum scaling in flue gas desulfurization systems which comprises a polyacrylate, polymaleic anhydride, and a phosphonate, and may include tolyltriazole and soluble zinc. The composition is suitable for corrosion and scale control in a combined process in which a portion of the cooling water blowdown is used for preparation of wash water for the mist eliminator in a flue gas desulfurization system. The cooling water contains 0.2–100 ppm active inhibitor composition, and the supplemental wash water contains 0.01–20 ppm active composition. A suitable inhibitor is added at 100 ppm to cooling water.

For $SO_x$, $NO_x$, $CO_2$ emission control, a number of processes have been reported as effective. The more widespread commercial technologies make use of lime and/or limestone and/or Mg compounds for $SO_x$ emission control and ammonia and/or urea for $NO_x$. Particular types of flue gas desulfurization processes are reported in U.S. Pat. No. 4,708,855, EPA 250,866, EPA 250,878.

JP 62,278,119 describes a process in which a $CaCl_2$—containing $Mg(OH)_2$ water slurry, which is formed by adding Ca compounds (e.g. CaO, CaO+MgO, $Ca(OH)_2$) to seawater, is treated with $MgSO_4$ aqueous solution to form $CaSO_4 \cdot 2H_2O$ which is separated from the aqueous slurry. The purified $Mg(OH)_2$ water slurry is used for flue gas desulfurization, and the $MgSO_4$ aqueous solution in this method is the recycled effluent from the desulfurization process. Thus, 18 ton/h seawater was mixed with CaO water slurry at pH 10.4–10.6 in a reactor, then the solid impurities (e.g. sand and $CaCO_3$) were separated by sedimentation. The remaining water slurry was overflowed and mixed with coagulant to obtain a $Mg(OH)_2$ water slurry, which was then treated with 3% $MgSO_4$ aqueous solution to form a precipitate of $CaSO_4 \cdot 2H_2O$. The purified $Mg(OH)_2$ water slurry was contacted with flue gas for desulfurization and the resulting $MgSO_4$ aqueous solution was recycled for purification of the $Mg(OH)_2$ water slurry.

Ger. Offen. 2,801,279 describes a process in which scrubbing solutions containing sulfates and hydroxides of Na, K or $NH_4^+$ are regenerated with time.

In JP 03 52,623 [91 52,623] $SO_x$ is removed from boiler flue gases by wet scrubbing with time slurry in an absorption tower comprising means for pumping seawater and lime into a mixing tank to obtain an aqueous slurry. To prevent corrosion, the concentration of COD, BOD and dissolved $O_2$ in the feed SW are preferably controlled at $\leq 1, \leq 1$, and $\leq 4$ ppm respectively, and the process piping materials are preferably made of SUS-316 L steel.

About modification of "classic" sorbents, one is to note WO 92/1509, in which smectite clay suspension in water containing $Na_2CO_3$ are reacted with stoichiometric amounts of soluble alkaline earth metal to form an alkaline earth metal carbonate, which after drying is suitable for $SO_x$ removal.

Concerning $NO_x$ removal, $NH_3$ addition is a common technique. U.S. Pat No. 4,029,752, U.S. Pat No. 4,288,420, U.S. Pat. No. 4,400,363, U.S. Pat. No. 4,272,497, U.S. Pat. No. 4,051,225, U.S. Pat. No. 3,900,554, U.S. Pat. No. 4,325,713, U.S. Pat. No. 4,321,241, U.S. Pat No. 4,853,193, are exemplary patents disclosing ammonia utilization.

Italian patent application No. ME92A000002 to MEG S.n.c. filed Mar. 30, 1992 discloses a process for decreasing metals corrosion and fouling in systems utilizing seawater, well, lake, river, waste waters and mixtures thereof.

Italian patent application No. ME92A000006 to MEG S.n.c. filed May 27, 1992 discloses a process for removing $SO_x$, $NO_x$, $CO_2$ from a gaseous mixture and sorbents for the scope.

Italian patent application No. ME92A000007 to MEG S.n.c. filed Jun. 18, 1992 discloses a process for utilizing waste waters from industrial processes.

All the examples hereinafter mentioned are merely an illustration of the invention and in no case are to be interpreted as a limitation.

DETAILED DESCRIPTION OF THE DRAWINGS

Figure 1:
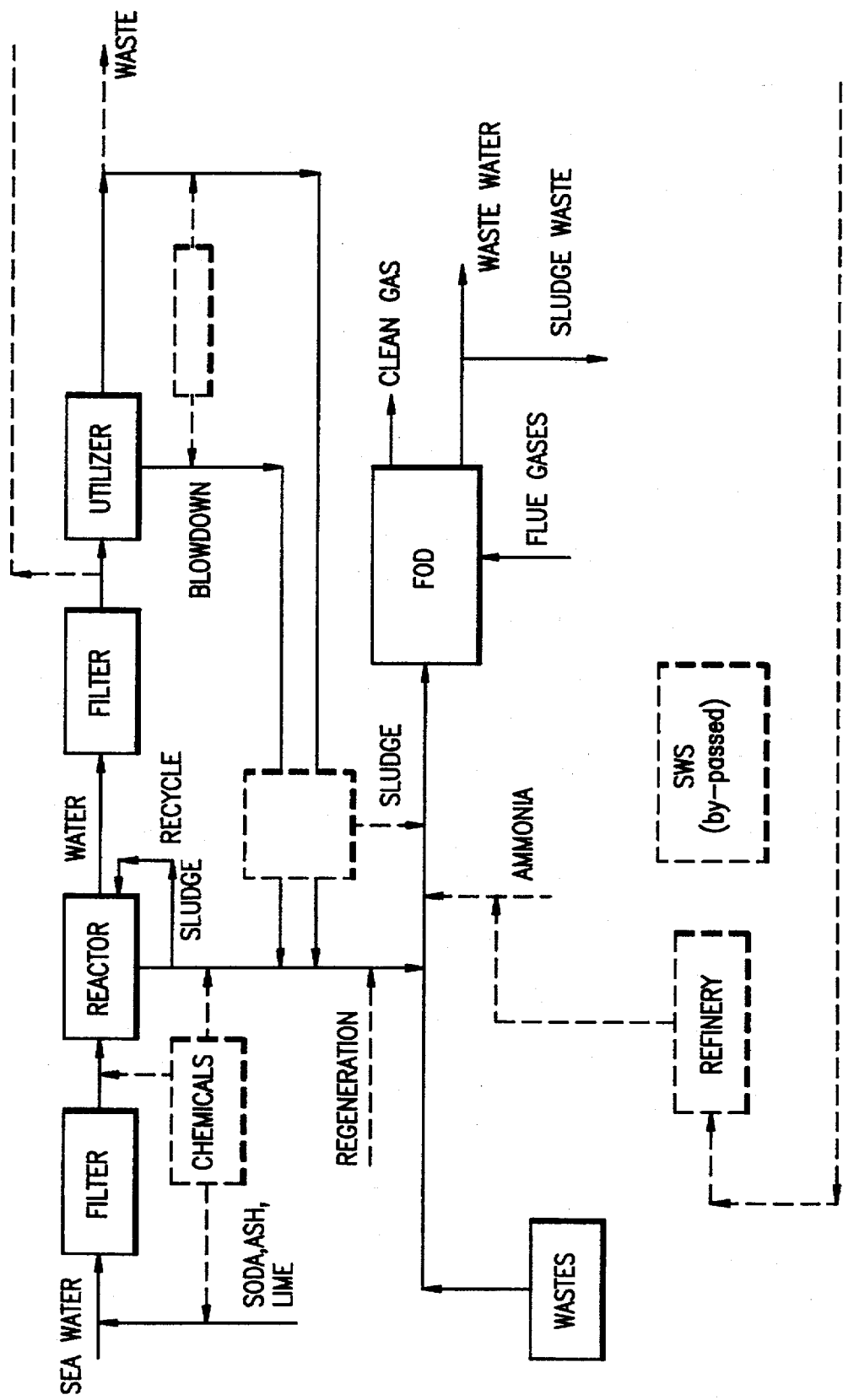
FIG. 1 is a block flow diagram of the described embodiment of the invention.

FIG. 1 illustrates by way of a block, flow chart, an embodiment of the invention for treating wastes in an aqueous solution. The water is reacted with soda ash and lime, as described below and the resulting solution is directed through a filter and into a reactor. Chemicals, such as those described below, can be added to the reactor. Sludge precipitates out of solution in the reactor and may follow any of three different pathways. The sludge may be recycled into the reactor, may be conveyed to a Flue Gas Desulfurization (FGD) unit or may be passed through a filter/utilizer. The material collected from the utilizer may be alkalinized to form a blowdown that is passed to the FGD unit either alone or combined with more sludge from the reactor. The material fed into the FGD unit may be combined with various or specific industrial wastes such as ammonia-containing feed water from a SWS (Sour Water Stripper) unit of a petroleum refinery, as depicted.

In the preferred embodiment, the present invention provides a process and water compositions to reduce, with the same process: 1) corrosion and fouling in water treatment applications, 2) waste waters and solid wastes disposal problems, 3) $SO_x$, $NO_x$ and $CO_2$ from a gaseous mixture. In this embodiment the process also provides a single process to reduce water, soil and air pollution.

To our knowledge, such process has never been proposed in today's state of the art and must be regarded as an innovation of current technology.

Throughout the description and claims, percentages and dosages (ppm) are by weight, temperatures are in degrees Celsius and pressures are in atmospheres, unless otherwise indicated. Percentages, dosages and ratios of components are considered exemplary and may be combined.

From the above, it is evident that if it should be possible to utilize SW without corrosion, scale, fouling and biofouling problems an improvement of today's state of the art would arise. It would be possible, e.g., to utilize SW—without changing metallurgy—in those systems projected for more worthy waters (e.g. well, river, take waters), making them available for human use; alternatively, the operation of plants and/or systems utilizing SW would be more economic. Excessive use of well water or surface water could be then avoided gaining a better water management, besides having an endless supply source.

If it should be possible to utilize SW without any problem, then utilizing well and/or river and/or lake and/or saline and/or brackish and/or waste water and mixtures thereof would more economic.

A preferred embodiment of the present invention is a process and chemical compositions to reduce corrosion, scale fouling and biofouling in metals utilizing seawater and/or well and/or river and/or take and/or saline and/or brackish and/or waste water and mixtures thereof.

In another embodiment, the present invention provides a process and chemical compositions to utilize carbon steel and/or other low cost materials in SW applications already utilizing costly materials.

It is now known that soda ash ($Na_2CO_3$) is a weak cathodic and anodic corrosion inhibitor, likewise are known its properties as a weak biocide.

Soda ash is not at all utilized to prevent water corrosion; for such purposes are utilized zinc based compounds, chromates (now abandoned for environmental reasons), nitrites, orthosilicates, polyphosphates (not suitable for SW), molybdates, or polysilicates.

Soda ash is only utilized together with lime in complete softening of water.

To our knowledge its use has never been proposed alone neither for softening nor in connection with water treatment to prevent corrosion and/or fouling and/or scale, and in particular has never been proposed in connection with SW treatment. Therefore its utilization in such connections must be regarded as surprising.

Moreover, it is well known the "side-stream softening" procedure (normally realized by lime softening) but this, besides being a less common practice, is utilized exclusively to lower recirculating water hardness (without any influence on corrosion and/or biofouling) and has never been proposed for SW. The same is true for make-up water softening.

In the sidestream softening of cooling tower blowdown, a lime slurry raises the pH to about 10 while soda ash provides provides $CO_3^=$ to precipitate Ca. The softener overflows are acidified to pH 9.8 by $CO_2$ gas injection in 2 stages in a recarbonator, filtered and then returned to the top of the cooling towers. $CO_2$ is continually stripped out in the cooling towers and must be injected into the cooling water before the cold water returns to the heat exchangers.

Such procedures have the sole purpose of lowering recirculating or make-up water hardness and are applied only on cooling towers. As a confirm of that, this kind of softening can be also accomplished with e.g. reverse osmosis, freeze crystallization and distillation techniques; in this connection it is of no importance if softening is realized with lime or any other means: it is important to lower water hardness only.

In industrial practice, water—generally well water, seldom river or lake water, but never SW—is time softened to lower its hardness only, to pretreat it as feed e.g. in ion exchange resins plant to make it boiler feedwater.

In partial softening, which is the most common practice, much of the calcium hardness is lowered and 10–20% of magnesium hardness is lowered. When a major magnesium hardness precipitation (thus obtaining complete softening) is to be reached, lime will be dosed in excess with regard to partial softening to reach the necessary $OH^-$ concentration (Mg will be precipitated as hydroxide). However, if Ca is sufficient or in excess to react with bicarbonates (Ca>total alkalinity M) a further addition of Ca is not convenient. In such a case, it is common practice to use caustic soda ($NaOH \rightarrow Na^+ + OH^-$) or lime and soda ($Ca(OH)_2 + Na_2CO_3 \rightarrow CaCO_3 + 2\ NaOH$) to produce the necessary $OH^-$ ions.

For partial softening, when Ca>M the theoretical formula is:

$$\text{ppm Ca (OH)}_2 = \frac{74(2CO_2 + M + 10\%Mg)}{\% \ Ca(OH)_2 \ \text{purity}}$$

For complete softening the theoretical formulae are:

$$\text{ppm Na}_2CO_3 = \frac{106(\text{Tot. Hardness} - M + 50)}{\% \ Na_2CO_3 \ \text{purity}}$$

where $Na_2CO_3$ is utilized, due to economic reasons, in alternative to NaOH.

Having a SW with the following characteristics (expressed a ppm of $CaCO_3$ equivalents):

TH=6750 Ca=1080 Mg=5670 M=130 $CO_2$=3

560 ppm of lime would be necessary for partial softening; for complete softening, 4643 ppm of lime and 7214 ppm of soda ash would be necessary.

It is then evident that chemical softening is uneconomical for SW (at today's prices roughly 2.3 $/m$^3$) and, moreover, it would not have any effect on chlorides (one of the main SW corrodents).

Surprisingly, we discovered that 500–2000 ppm soda ash alone are sufficient to face corrosion, scale, fouling and biofouling of SW.

Adding little amount of lime permits one to reduce soda ash addition, with consequent cost reduction: e.g. 500 ppm lime reduces soda ash dosage at 1000 ppm (global cost about 0.3 $/m$^3$) instead of 2000 ppm (cost about 0.6 $/m$^3$) with a cost reduction of about 0.2–0.3 $/m$^3$.

The present invention provides a soda ash-lime water treatment to reduce corrosion, scale, fouling and biofouling of waters, in particular SW, as opposite to lime or lime-soda softening that only reduces scale.

The present invention differentiates from softening in that soda ash, as opposite to lime, is the main reactant. In softening, soda ash is ancillary to lime: soda ash is utilized only because it is not convenient to utilize a lime excess, and to produce sufficient $OH^-$ to precipitate Mg; soda ash substitutes NaOH addition only due to economic reasons, and for the purposes of softening can be easily substituted by lime and/or caustic. As a common practice, soda ash is not added to water.

In the preferred embodiment of the present invention soda ash is the main reactant and cannot be totally substituted by lime and/or caustic. In SW and/or saline and/or brackish water application of present invention a little amount of lime can be added to reduce soda ash dosage, but soda ash to lime ratio is preferably >1, preferably from 1 to 5, most preferably from 2 to 3. Dosage of soda ash alone ranges from 1 to 10,000 ppm, preferably from 1 to 5000 ppm, most preferably from 5 to 2000 ppm.

In well and/or river and/or lake and/or waste water application soda ash to lime ratio can be <1, preferentially from 0.2 to 5, most preferentially from 0.2 to 2. Dosage of soda ash alone ranges from 1 to 5000 ppm, preferably from 1 to 2000 ppm, most preferably from 1 to 1000 ppm.

Rarely, lime softened water (e.g. river water) is utilized as make-up water in cooling tower applications: in this case softening only eliminates part of hardness and suspended solids; water softened in such a way in any case necessitates a complete chemical treatment to avoid corrosion, scale, fouling and biofouling. A list of chemicals ("classic") commonly used for the scope will be given hereinafter. Soda lime, NaOH or time use is reported for water neutralization, but in this connection aeration gave the best results; this confirms that all these chemicals can be substituted by other techniques.

The fact that softening alone is not sufficient for corrosion prevention is confirmed by the already cited PL 124,465 (apart from the fact that softened side stream or make-up cooling waters are regularly treated against corrosion and fouling).

The fact that in current technology $Na_2CO_3$ utilization is ancillary to time and can be omitted is confirmed by Chemical Abstract 103: 200624p in which a zero-discharge water purification system produces high quality desalinated and softened water for power plant without using $Na_2CO_3$; the system involves liming-coagulation, softening by Na-cation exchangers and chemical desalination by H- and OH- anion exchangers. This further confirms that soda ash addition in softening is not at all intended for corrosion control but merely as a hardness reducing agent when lime dosage has some shortcomings; in this connection soda ash can be easily displaced by other softening means.

The present invention differs from side-stream softening in that it utilizes only soda ash and eventually lime, and in much lower amounts in comparison to chemical softening; moreover, it has the main purpose in reducing corrosion, fouling and biofouling, and it can be applied to SW and to systems other than cooling towers. When "classic" chemicals are eventually used in connection with the present invention, deposit control agents are preferred and are dosed to a ratio from 1:100,000 to 1:20,000 referred to soda ash dosage, that is at a very much lower dosage than that of common practice. No "classic" corrosion inhibitor is utilized. Some biocides can be supplemented from time to time, preferably chlorine compounds, to change the environment for microorganisms, and in any case at a dosage much lower than that used in common operation (e.g. <0.05 ppm residual chlorine).

In the present invention soda ash could be the sole chemical added to water, making use of its corrosion inhibiting and biocidic properties; moreover, eventually together with time, it would reduce inorganic salt concentration and would limit their precipitation.

To confirm the difference between softening and the present invention, it is noted that softening has no influence on chlorides, well as known responsible for corrosion in general and in particular of SW corrosion: if the present invention would only "soften" (precipitating only part of present hardness, that has practically no influence on water corrosiveness) one should not note any positive effect on corrosion; the same for sulfates, rated as main corrodents.

In the present invention, on the contrary of what can be supposed from the state of the art, SW corrosion is notably reduced, having a constant value of chlorides and a less amount of sulfates—but their value still remains high. Likewise corrosion of other kinds of water is reduced.

The invention will be illustrated with some examples. These examples merely serve as an illustration and may in no case be interpreted as a limitation of the invention. The examples can be found in the following tables. The abbreviations used in these tables are given below:

Belgard: a polycarboxylic acid antiscale marketed by Ciba-Geigy

Product A: a multifunctional commercial product containing a zinc compound (2.6%), polyacrylate (10%), tannins (4%) and phosphonates (18%).

The tests performed with SW were undertaken using a sample from harbor SW, to simulate the worst conditions of bacteria and microorganism contamination. Such SW composition will be described afterwards.

All the tests hereinafter described were performed using the Static Corrosion Test (SCT) technique, in which a preweighed corrosion coupon was set in a beaker containing the test water and a stirrer set a 2500 rpm; temperature was controlled via a Vertex set at 50° C., so this parameter ranged between 50°–55° C. (to simulate temperature variations in a heat exchanger). Tests were 12 hours long. Corrosion rates were calculated from coupon weight loss incurred during the test period. Coupons were of C1010 carbon steel, weighed about 8.6 g and had a surface of 21 cm$^2$.

The first set of experiments was performed simulating a less turbulence case (making use of a large beaker of 1000 ml). The results are summarized in table 1:

TABLE 1

| System | Coupon material | Weight loss | Coupon visual appreciation |
|---|---|---|---|
| SW | C 1010 | 25.2 mg | corroded, heavy fouled |
| SW + 1000 ppm Na$_2$CO$_3$ + 500 ppm Ca(OH)$_2$ | C 1010 | 2.1 mg | no corrosion, completely free of fouling |

Then the experiments were performed only simulating a high turbulence case (making use of a Berzelius beaker of 300 ml). The results are listed in table 2:

TABLE 2

| System | Coupon material | Weight loss (mg) | Coupon visual appreciation |
|---|---|---|---|
| SW | C 1010 | 34.4 | heavy corrosion, heavy fouling |
| SW + 1000 ppm Na$_2$CO$_3$ + 500 ppm Ca(OH)$_2$ | C 1010 | 6.4 | no corrosion, completely free of fouling |
| SW + 10 ppm Belgard | C 1010 | 31.4 | heavy corrosion, heavy fouling |
| SW + 10 ppm Belgard | C 1010 | 27.7 | heavy corrosion, heavy fouling |
| SW + 50 ppm Product A | C 1010 | 25.3 | corroded, heavy fouling |
| SW | CDA 443 admiralty | 18.2 | slight corrosion, slight fouling |
| SW + 1000 ppm Na$_2$CO$_3$ + 500 ppm Ca(OH)$_2$ | CDA 443 admiralty | 4.6 | no corrosion, completely free of fouling |

Some tests were also performed to evaluate SW fouling and scale tendency on C 1010 carbon steel with increasing concentration. Concentration number was calculated from the ratio of water volume at the beginning of the test to water volume at the end of the test. The results are brought together in table 3:

TABLE 3

| System | Conc. number | Deposit weight | Coupon visual appreciation |
|---|---|---|---|
| SW | 1.95 | 68.4 mg | heavy corrosion, heavy fouling |
| SW + 1000 ppm Na$_2$CO$_3$ + 500 ppm Ca(OH)$_2$ | 2.65 | 33.3 mg | no corrosion, slight fouling |

In all the tests soda ash was injected as a 10% solution and lime as a 5% slurry.

Other tests were performed to evaluate the role of lime and soda ash in the invention and to demonstrate that the performances are not due merely to a minor salt concentration in the system. All the tests are performed in SW with C 1010 carbon steel corrosion coupons. The results are brought together in table 4:

TABLE 4

| ppm Na$_2$CO$_3$ | ppm Ca(OH)$_2$ | Weight loss mg | Coupon visual appreciation |
|---|---|---|---|
|  | 3000 | 32.5 | corroded, localized heavy fouling |
| 750 | 500 | 10 | no corrosion, very slight fouling |

TABLE 4-continued

| ppm Na$_2$CO$_3$ | ppm Ca(OH)$_2$ | Weight loss mg | Coupon visual appreciation |
|---|---|---|---|
| 600 | 500 | 14 | no corrosion, very slight fouling |
| 500 | 500 | 19.9 | slight corrosioin, slight fouling |
| 1000 |  | 8 | no corrosion, very slight fouling |
| 1500 |  | 7 | no corrosion, no fouling |

From table 4 it becomes evident that the results are not simply due neither to a minor salt concentration in the system nor to lime (even at high concentration it does not give appreciable performance); it also becomes evident the role of soda ash, with decreasing concentrations the performances decrease.

The results are not simply due to lime-soda ash reaction which gives caustic soda. As a matter of fact tests performed by adding NaOH have brought the results summarized in table 5:

TABLE 5

| ppm Na$_2$CO$_3$ | ppm Ca(OH)$_2$ | ppm NaOH | Weight loss (mg) | Coupon visual appreciation |
|---|---|---|---|---|
| 500 |  | 100 | 15.7 | slight corrosion, no fouling |
|  | 500 | 700 | 14.9 | slight corrosion, localized fouling |

The reason of such performances, in our opinion, is probably an effect of the combination after soda ash and lime addition. First of all soda ash is a weak cathodic and anodic corrosion inhibitor, then with a certain dosage, it unfolds its action without the detrimental effects of zinc and/or chromates (cost and pollution). Moreover, soda ash reduces sulfates in SW, reducing the SW corrosive potential. Sulfates reduction, in turn, brings a minor amount of sulfate-reducing bacteria, which corrode iron and precipitate iron for direct reaction with S$^=$ (reaction product of sulfates in anaerobic environment), according to the global reaction:

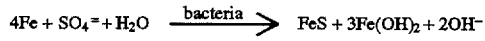

$$4Fe + SO_4^= + H_2O \xrightarrow{bacteria} FeS + 3Fe(OH)_2 + 2OH^-$$

Following the addition of soda ash and lime, SW corrosion is reduced, especially on carbon steel, because: a) water pH is increased; b) oxygen solubility is decreased due to increased dissolved salts and increased conductivity.

Surely the invention's performances are not due to limestone deposition (which reduces current density necessary to cathodic protection). If this would not be true, then SW corrosion without any chemical would be much less than that of treated SW—due to a major amount of limestone deposits. Moreover, it is well known that CaCO$_3$ precipitated in uncontrolled conditions is not at all protective. If the treatment key would be pH, the same minor corrosion would be obtained with caustic and/or lime too.

Tests were undertaken to compare the effect of NaClO (biocide) and Na$_2$SO$_3$ (oxygen scavenger) alone with the performances of present invention. NaClO was added in an amount sufficient to have a residual chlorine concentration in SW of 4 ppm; Na$_2$SO$_3$ was added in an amount sufficient to have a residual oxygen concentration in SW of 3–4 ppm. Table 6 summarizes the achieved results:

TABLE 6

| System | Weight loss (mg) | deposit weight (mg) | Coupon visual appreciation |
|---|---|---|---|
| SW + NaClO | 56.8 | 89.6 | heavy localized fouling and corrosion |
| SW + Na$_2$SO$_3$ | 139 | 22 | diffused corrosion and black fouling |

It can be further supposed that treatment increases magnesium cathodic inhibition. In fact, deposit composition, which forms at the cathode due to OH$^-$ action, varies with current density. Ca/Mg ratio in the precipitate decreases with increasing current density. A greater solution conductivity will increase magnesium amount in the precipitate and, in turn, cathodic protection. Moreover, the effect of Mg must be taken into account, which, in the presence of iron, at elevated temperatures too, lowers water pH. In this situation it is then useful to "take away" Mg from water and let the cathodic deposits on metal surfaces contain a major amount of it.

One should take into account, and this gives a greater value to previous performances, that Na$_2$SO$_4$ solution (that remains in SW following sulfates precipitation) has an initial corrosion rate (0–300 hours) similar to that of SW, afterwards, corrosion increase is practically insignificant. This means, treated SW in our tests (12 h long) had no benefit of reduced sulfates concentration and the achieved coupons weight losses are to be interpreted as lower. In practice, it was as sulfates effect would have no modification. This all finds a confirmation in corrosion rates obtained in longer tests, as hereinafter described.

Due to 1500 ppm soda ash and 500 ppm time addition, SW characteristics change approximatively as shown in table 7:

TABLE 7

| parameter | Seawater | Treated seawater |
|---|---|---|
| pH | 7.9 | 8.5 |
| oxygen (ppm) | 7.5 | 6.5 |
| sulfates (ppm Na$_2$SO$_4$) | 3900 | 3200 |
| conductivity (μS/cm) | 42000 | 53000 |
| total hardness (ppm CaCO$_3$) | 6750 | 4150 |
| Ca (ppm CaCO$_3$) | 1080 | 500 |
| Mg (ppm CaCO$_3$) | 5670 | 3650 |
| silica (ppm) | 13.2 | 7.4 |
| chlorides (ppm NaCl) | 37140 | 37140 |
| P alkalinity (ppm CaCO$_3$) | 7 | 18 |
| M alkalinity (ppm CaCO$_3$) | 139 | 121 |

Concerning scale and fouling, the present invention gives SW better characteristics, as most of dissolved salts are precipitated following soda ash and lime addition. Among the important occurring reactions are:

$Na_2CO_3 + CaSO_4 \rightarrow CaCO_3 + Na_2SO_4$
$Na_2CO3 + Ca(OH)_2 \rightarrow CaCO_3 + 2\ NaOH$
$2NaOH + Ca(HCO_3)_2 \rightarrow CaCO_3 + Na_2CO_3 + H_2O$
$2NaOH + MgSO_4 \rightarrow Mg(OH)_2 + Na_2SO_4$
$4NaOH + Mg(HCO_3)_2 \rightarrow Mg(OH)_2 + 2Na_2CO_3 + 2H_2O$
$Ca(OH)_2 + MgSO_4 \rightarrow Mg(OH)_2 + CaSO_4$
$Ca(OH)_2 + Ca(HCO_3)_2 \rightarrow 2CaCO_3 + 2H_2O$
$Ca(OH)_2 + MgCl_2 + Na_2CO_3 \rightarrow CaCO_3 + Mg(OH)_2 + 2NaCl$
$Ca(OH)_2 + MgCl_2 \rightarrow Mg(OH)_2 + CaCl_2$
$2Ca(OH)_2 + Mg(HCO_3)_2 \rightarrow 2CaCO_3 + Mg(OH)_2 + 2H_2O$
$CO_2 + Ca(OH)_2 \rightarrow CaCO_3 + H_2O$
$Ca(NO_3)_2 + Na_2CO_3 \rightarrow CaCO_3 + 2NaNO_3$ $CaCl_2 + Na_2CO_3 \rightarrow CaCO_3 + 2NaCl$
$Ca(OH)_2 + MgSO_4 + Na_2CO_3 \rightarrow CaCO_3 + Mg(OH)_2 + Na_2SO_4$
$Ca(OH)_2 + Mg(NO_3)_2 + Na_2CO_3 \rightarrow CaCO_3 + Mg(OH)_2 + 2NaNO_3$
$CaCl_2 + Na_2CO_3 \rightarrow CaCO_3 + 2NaCl$
$Ca(NO_3)_2 + Na_2CO_3 \rightarrow CaCO_3 + 2NaNO_3$.

Sulfates reduction is particularly important in that commercial antiscale compounds are not effective against $CaSO_4$ deposition. Moreover, the process and additives here claimed lower Ca concentration below 700 ppm (as $CaCO_3$), which then favors $CaSO_4$ solubility (given the high chloride content).

The present invention can be accomplished in an apparatus similar to that used in lime softening and well known to the skilled in the art. Among these apparatuses the sludge-contact softeners are preferred. In sludge-contact softeners sludge (which contains sulfates and works as a crystallization center) recycle permits a fast sulfates abatement. A further fouling reduction contribution is given by sludge in that it incorporates suspended solids and other stuffs present in SW. Upstream and downstream in the apparatus, filters can be provided to eliminate debris and any possible carry-over. $Mg(OH)_2$ precipitation will lower dissolved silica content (which absorbs on the precipitate) with consequent minor inconvenience in SW utilization. Sludge recycle and sludge contact in the "reactor-softener" provide, moreover, a possible contact stabilization of seawater with a consequent scale deposition decrease.

Another preferred embodiment of the present invention is a process to reduce water biofouling, preferably SW biofouling.

Regarding biofouling, the present invention contributes to a substantial microorganism growth reduction. Soda ash is a weak biocide and soda ash-lime addition reduces sulfates and this induces less sulfate-reducing bacteria; the process brings SW at pH>8.4, where microorganism growth is unfavored. Salinity increase and oxygen reduction both act in controlling marine growth. SW microorganisms in the present invention are submitted to a contemporary change in pH, in salinity and in oxygen that renders their life difficult.

Soda ash-lime biofouling control, as provided in the present invention, is advantageous with regard to chlorine in that chlorine lowers water pH and increases alkalinity, with consequent corrosion and salt deposition increase. Moreover, chlorine effectiveness as biocide is pH-dependent (more active at low pH), therefore in SW systems (pH 7–8) its action is unfavored and it is difficult to control biological growth with chlorine. Chlorine addition in SW increases impingement attack of copper alloys, as it disturbs passivation film formation.

Soda ash-lime biofouling control, as provided in the present invention, is effective even at high pH and does not increases impingement attack of copper alloys.

Soda ash, to our knowledge, has never been proposed as biocide for seawater, and its utilization in such connection must be regarded as an improvement of current technology.

Some tests were performed to evaluate microorganisms growth in SW treated as described in the present invention.

The test apparatus and conditions were the same as previously described, the only difference being the use of three C 1010 carbon steel coupons instead of one; the three coupons were set at the vertex of rectangular triangle. Untreated SW was compared to treated SW; in both experiments SW concentration was roughly 2 (where this number expresses the ratio between the concentration of a certain ion, e.g. $Cl^-$, in make-up SW and the concentration of the same ion in beaker SW (which is heated)). At the end of the tests coupons were immersed in suitable culture medium and evaluated for total microorganisms count and predominant species. The results are brought together in table 8:

TABLE 8

| System | Test period | Total count | Visual appreciation |
|---|---|---|---|
| SW | 390 hours | $3 \times 10^8$ CFU/ml | very heavy corrosion, very heavy fouling |
| SW + 100 ppm $Na_2CO_3$ + 500 ppm $CaOH_2$ | 420 hours | $3 \times 10^6$ CFU/ml | slight corrosion, slight fouling |

In both cases the most representative species were *Ferrobacillus ferrooxidans* and Thiobacillus. An approximate evaluation of weight loss was also performed, giving a value of 350 mg for untreated SW and 75 mg for treated SW.

In another embodiment the invention provides a process to treat feed and to reduce corrosion, scale, fouling and biofouling in SW desalination plants. In fact part of $CaSO_4$ is converted in $Na_2SO_4$ and, moreover, the minor mount of Ca present in water increases unconverted $CaSO_4$ solubility. $CaCO_3$ and $MgCO_3$ precipitation and separation from feedwater allows a higher distillation temperature (163°–176° C.) and, in turn, a cost reduction due to better thermodynamic performance. In such plants, Mg reduction in feedwater—following the present invention—contributes to reduce corrosion. It has been already said that in boiling SW solutions, Mg provokes, in iron's presence, a pH lowering (up to 5.3).

In a further embodiment the invention provides a process to reduce corrosion, scale, fouling and biofouling in static SW, with the consequent utilization of such process, e.g., in firefighting systems, in not working sea-lines, etc. In table 9, the results obtained by immersing for C 1010 carbon steel coupons in static SW (coupons were set in a test tube) for 31 days are set forth

TABLE 9

| ppm $Na_2CO_2$ | ppm $Ca(OH)_2$ | Weight loss (mg) | Coupon visual appreciation |
|---|---|---|---|
| | | 30.8 | very heavy corrosion, very heavy fouling |
| 5000 | | 10.8 | slight corrosion, slight fouling |
| 10000 | | 5.6 | slight corrosion, no fouling |
| 20000 | | 3.1 | no corrosion, no fouling |
| | 7000 | 13.6 | slight corrosion, heavy fouling |

In another embodiment our invention provides a process that allows for different construction material utilization in marine applications. In this embodiment SW treated with our process offers major advantages in comparison to traditional SW systems. Due to decreased corrosion, scale, fouling and biofouling, it will be possible to utilize carbon steel with economic advantages over copper alloys. Once copper alloys are eliminated, this will give the advantage of utilizing some antiscale in SW cooling towers other than common phosphonates, normally used therefore which are highly corrosive to admiralty. The minor SW sulfates content will limit sulfate-resistant cement. Treated SW utilization, particularly in cooling applications, eliminates make-up water freezing problems in cold climates and gives rise to a greater ΔT and, in turn, a less exchanger surface. Concentration increase, associated with once-through elimination, saves pumping costs. There is, besides that, the advantage to operate at low installed capital costs and "high" operative costs, with consequent minor pay-off periods. The operation at chloride concentrations of 60,000–90,000 ppm, instead of 30,000 ppm, has no influence on corrosion: literature, on the contrary, says that chlorides corrosion on carbon steel decreases at concentrations >30,000 ppm.

Performance of the present invention can be eventually improved by water degassing, e.g. by low temperature vacuum treatment and/or by chemical treatment (e.g. with sodium sulfite).

All what has been said for SW is applicable for well and/or river and/or lake and/or waste and/or saline and/or brackish waters.

To prove the invention's performance with other water types, tests were made with a saline well water.

Treating such well water (WW) with 300 ppm of soda ash and 500 ppm lime, the following results were achieved.

Water modifies its characteristics as summarized in table 10:

TABLE 10

| parameter | Well water | Treated well water |
| --- | --- | --- |
| pH | 8.0 | 9.6 |
| conductivity (μS/xm) | 2130 | 3650 |
| total hardness (ppm $CaCO_3$) | 880 | 260 |
| Ca (ppm $CaCO_3$) | 500 | 140 |
| Mg (ppm $CaCO_3$) | 380 | 120 |
| chlorides (ppm NaCl) | 700 | 700 |
| P alkalinity (ppm $CaCO_3$) | No one | 50 |
| M aklalinity (ppm $CaCO_3$) | 178 | 350 |

In this case, the same analysis as made for SW is to be done: due to high chloride content this WW would be corrosive and mere "softening" would not solve the problem.

On this WW, the same Static Corrosion Tests were performed as for SW (high turbulence, 2500 rpm, T=50°–55° C., C 1010 carbon steel coupons), but with varying water concentration number (Nc). For Nc=1.5–1.6, the results are brought together in table 11:

TABLE 11

| ppm $Na_2CO_3$ | ppm $Ca(OH)_2$ | Weight loss (mg) | Deposit weight (mg) |
| --- | --- | --- | --- |
|  |  | 59.5 | 160.8 |
|  | 500 | 41.5 | 106.3 |
| 300 | 500 | 1.1 | 10.4 |

It is worth noting that only lime addition (even at the amount necessary for complete softening) does not give substantial improvements over the base case, while soda ash addition gives much better performance.

Other tests were performed by increasing Nc, with the aim of estimating our invention effectiveness in existing plants which desire to save make-up water. Adding 300 ppm soda ash and 500 ppm lime, two high concentration tests have been done, the results of which are brought together in table 12:

TABLE 12

| Nc | Weight loss (mg) | Deposit weight (mg) |
| --- | --- | --- |
| 3.5 | 42 | 85 |
| 4 | 47 | 100 |

It is then evident that with the claimed process make-up water can be drastically reduced without any detriment.

To compare these results with a commercial technology we tested Product A with WW in the same conditions. Product A is a successful chemical used in cooling apparatuses. For example, in an industrial cooling apparatus (which serves an LLDPE plant) Product A is dosed at 15–20 ppm obtaining a corrosion rate of 0.4–0.6 mpy, measured with coupons extracted every 30 days (at Nc=2–2.5); the cooling towers make-up water (clearly more easy to treat than WW) has the characteristics listed in table 13:

TABLE 13

| pH | 7.5 |
| --- | --- |
| conducitivity (μS/cm) | 450 |
| total hardness (ppm $CaCO_3$) | 320 |
| Ca (ppm $CaCO_3$) | 180 |
| Mg (ppm $CaCO_3$) | 140 |
| chlorides (ppm NaCl) | 25 |
| P alkalinity (ppm $CaCO_3$) | 30 |
| M alkalinity (ppm $CaCO_3$) | 240 |

Product A was added to WW at a dosage of 50 ppm operating conditions were the same as in table 11 (T=50°–55° C., 2500 rpm, 12 h Nc=1.5–1.6, C 1010 carbon steel coupons).

Product A gave rise to a 33.3 mg weight loss and 62.6 mg deposits.

This all confirms the improvement over current technology obtained with our invention.

Effects comparable to those obtained with sodium carbonate can also be obtained with sodium bicarbonate.

For the purpose of the present invention soda ash and lime can be added together with a minor amount of the following active components:

a) one or more water soluble polymers;

b) one or more water soluble phosphonates;

c) one or more chemicals capable of preventing deposits;

d) one or more water soluble biocides and biodispersants.

Such components will be added at a ratio from 1:100,000 to 1:20,000, preferably from 1:80,000 to 1: 20,000, most preferably from 1:40,000 to 1: 20,000, referring to the soda ash dosage.

The water soluble polymers may be of any kind. The only prerequisite is that they have calcium carbonate stabilizing and/or anticorrosive properties, alone or in combination with other chemicals. They may be prepared from anionic, non ionic, cationic or betaine containing monomers or mixtures thereof.

Examples of anionic monomers are: acrylic acid, methacrylic acid, maleic add, itaconic acid, 3-acrylamido-3-methyl-butanoic acid, sulfonate containing monomers such as vinylsulfonic add, methylsulfonic add, 2-acrylamido-2-methylpropanesulfonic acid, allylhydroxypropylsulfonate ether, styrenesulfonic acid, sulphate containing monomers such as the sulfate ester of hydroxypropyl (meth)acrylate, phosphonate containing monomers such as 2-acrylamido-2-methylpropanephosphonic acid and isopropenylphosphonic acid, phosphate containing monomers such as allyl-2-hydroxypropylphosphate ether.

Examples of non ionic monomers are acrylamide, t-butylacrylamide, acrylonitrile, maleic anhydride, vinylacetate, vinylalcohol, allylalcohol, esters of acrylic and methacrylic acid such as ethylacrylate and methylmethacrylate, hydroxyethylacrylate, 2-hydroxypropylacrylate, hydroxyethylmethacrylate, allylamine, vinylamine, polyalkylene glycol (meth)acrylate.

Betaine containing monomers such as N-methacroyloxyethy-N-(3-sulfopropyl) -N,N-dimethylammonium betaine, N-methacroyloxyethyl-N-(3-phosphonopropyl) -N,N-dimethylammonium betaine, N-methacroyloxyethyl-N-(3-sulfatopropyl) -N,N-dimethylammonium betaine, N-methacroyloxyethyl-N-(3-phosphatopropyl) -N,N-dimethylammonium betaine.

Examples of cationic monomers are dimethyl diallyl ammoniumchloride, diethyldiallyl ammoniumchloride, methacroyloxyethyl trimethyl ammonium chloride. EPA 0181151 gives an extensive list of exemplary cationic polymers.

Besides the above mentioned monomers, the polymers may also contain other groups such as phosphonate, sulfonate or sulfate end groups or phosphino groups.

Mixtures of different polymers are also included in the invention.

The phosphonate may also be of any kind as long as they have antiprecipitant and/or anticorrosive properties. The most well known phosphonates are nitrilotrimethylenephosphonic acid, hydroxyethylidenediphosphonic acid, phosphonobutanetricarboxylic acid and 2,2-hydroxyphosphonoacetic acid. Mixtures of different phosphonates are also included in the invention. EPA 093508 further gives an extensive list of exemplary phosphonates.

Scale inhibitors can be of different chemical nature. Examples of scale inhibitors included in the present invention are:

tannins;

lignosulfonates;

phosphorus containing inorganic chemicals such as phosphates, polyphosphates, orthophosphorus acid or its salts;

organic carboxylic acids such as cycloaliphatic carboxylic acids, aliphatic carboxylic acids, aromatic or heterocyclic carboxylic acids;

polymeric diols such as polyalkyleneglycol, copolymer of ethyleneoxide and propyleneoxide, ethoxylated and/or proposylated organic molecules;

polyhydroxy compounds such as mannitol, sorbitol, etc.;

phosphate esters such as polyol phosphate esters, alkyl acid phosphates, ethoxylated alkyl acid phosphates.

EPA 491391 gives a further list of exemplary products (surfactants, sequestrants, chelating agents, biocides, antifoams) that can be used in connection with the present invention.

The list of the above mentioned products serves just as an illustration and may in no case be interpreted as a limitation of the invention.

A further embodiment of our invention is to provide a process that gives rise to no pollution of the discharged water. The chemical compounds normally used in water treatments give an undoubted contribution to water pollution (think about zinc, phosphorus and biocides in general). Under our process, it is possible to run the cooling system under high cycles of concentration with formulations containing very little amounts of polluting chemicals or even without such formulations. As can be seen from the previous examples, zinc, phosphorus and nitrogen compounds can eventually be suppressed from water treatment formulations. The addition of soda ash and lime, followed by sludge separation, does not give any organic and/or polluting contribution to effluent water. An eventual pH increase can be corrected with acid or $CO_2$ addition.

From the above description, it is evident that chemical dosages can be determined, due to the broad field of application of the present invention, from time to time following the water type, the system to be utilized and the result to be achieved. Soda ash dosage ranges from 10 to 10,000 ppm, preferably from 10 to 3000 ppm, most preferably from 10 to 1500 ppm. Lime dosage ranges from 10 to 3000 ppm, preferably from 10 to 1000 ppm, most preferably from 10 to 700 ppm.

Another preferred embodiment of present invention is a process to reduce corrosion, scale, fouling and biofouling of waste waters and to permit their utilization e.g. in cooling apparatuses and/or firefighting apparatuses and/or desalination plants.

In another preferred embodiment the present invention provides a process to utilize waste waters with low cost metallurgies, as carbon steel, to avoid utilization of costly metallurgies utilization and/or to render their utilization much more economic.

For the sake of brevity we will focus this process description on exhausted SW coming from Mg/MgO production plants.

In today's state of the art SW that has reacted with lime and/or NaOH, from which most Mg has been precipitated, is sea disposed after pH correction via acidification or dilution with huge amounts of SW. Disposal bears a cost in any case.

If it would be possible to utilize such water, as opposed to disposal, an improvement could be realized in today's state of the art.

If, moreover, such utilization could be realized making use of low cost metallurgies, like carbon steel, instead of costly metallurgies, another improvement over today's state of the art would be realized.

SW utilization problems have been already described in the previous section, like some of the possible applications of the present invention and some considerations on working principles of the present invention; they are all intended to be completely reported in this section.

In this new connection, the process of the present invention consists in adding soda ash and eventually lime to waste waters, separating the sludge eventually formed, clarifying and eventually filtering effluent water. In general, only soda ash is sufficient to the scope, and working dosages are less than those described in the previous section.

In the previous section we disclosed, among the others, that SW with a minor amount of Mg has better characteristics from a corrosion control standpoint.

In Mg/MgO production, SW is depleted from mostly Mg originally present. Lime is used as a precipitant and approximately 1.4 Kg lime are required to precipitate 1 Kg MgO. If SW has about 1300 ppm $Mg^{2+}$ a dosage of about 3000 ppm lime will be required; to this value a 10% excess is normally added.

Lime and/or NaOH are then added to the exclusive scope for precipitating Mg and not for the purposes of the present invention: as a matter of fact, exhausted SW is disposed as a waste water.

As lime is added for process purposes (Mg precipitation) it will be then sufficient, under the present invention, to add a little amount of soda ash to exhausted seawater to obtain a water that gives no rise to corrosion, scale, fouling and biofouling problems; moreover, it will be possible to utilize carbon steel metallurgies instead of costly ones.

This all was verified via Static Corrosion Tests, performed as previously described (high turbulence, 2500 rpm, T=50–°55° C., 12 h, C 1010 carbon steel coupons). The results are brought together in table 14:

TABLE 14

| $Na_2Co_3$ (ppm) | Weight loss (mg) | Deposit weight (mg) | Coupon visual appreciation |
|---|---|---|---|
|  | 17.5 | 47.2 | heavy corrosion, heavy fouling |
| 30 | 12.1 | 22.4 | slight corrosion, slight fouling |
| 50 | 4.9 | 7.6 | no corrosion, no fouling |

For the purpose of the present invention soda ash can be added together with a minor amount of the following components:

a) one or more water soluble polymers;
b) one or more water soluble phosphonates;
c) one or more chemicals capable of preventing corrosion and/or deposits;
d) one or more water soluble biocides
e) one or more water soluble antifoams.

The examplary types of such components have already been described in the previous section. Among these components, polymers, particularly polyacrylamides and polyacrylates, are to be preferred.

Commercial technologies have also been evaluated to compare their results with those of present invention. The results are brought together in table 15:

TABLE 15

| Chemical | Weight loss (mg) | Deposit weight (mg) | Coupon visual appreciation |
|---|---|---|---|
| 30 ppm Product A | 14.4 | 73.6 | slight corrosion, heavy fouling |
| 50 ppm Product A | 5.7 | 10 | no corrosion, slight fouling |
| 5 ppm Belgard | 19.5 | 27.2 | heavy corrosion, heavy fouling |

The present invention has also been evaluated on CDA 443 admiralty coupons. The results are brought together in table 16:

TABLE 16

| $Na_2CO_3$ (ppm) | Weight loss (mg) | Deposit weight (mg) | Coupon visual appreciation |
|---|---|---|---|
|  | 6.4 | 9.2 | no corrosion, slight fouling |
| 50 | 1 | 2.3 | no corrosion, no fouling |

The above is a further confirmation of what is disclosed in the previous section, that is, that performances are improved following soda ash and/or lime and/or NaOH addition. As a matter of fact, in exhausted SW a few Mg are present; besides that, $CaCO_3$ cannot deposit on metallic surfaces because SW was previously decarbonized; mere lime "softening", even with huge amounts of time, gives no positive effects on corrosion, scale, fouling and biofouling control.

The very little amounts of soda ash added confirms the fundamental role of such compound in corrosion, scale, fouling and biofouling control. It is surprising how the performances are changed with the addition of only 30–50 ppm soda ash (treated exhausted SW), even if exhausted SW has been already treated with 3000–3500 ppm lime.

From a scale/fouling control standpoint the present invention gives the water better characteristics in that most of the dissolved salts are precipitated following lime and soda ash addition. As already cited, such embodiments are of value for the same considerations and effects disclosed in the previous section (e.g. sulfate and Mg reduction, sludge recycle, silica reduction, biofouling control).

Treated exhausted SW, under the present invention, is particularly useful as desalination plants feedwater (e.g. MSF). Exhausted SW is in fact already decarbonized and this allows higher distillation temperatures (163°–176° C.) and a cost reduction due to better system thermodynamic performance. In such view, and generally speaking, HCl utilization, instead of sulfuric acid, for decarbonization improves exhausted SW characteristics for its subsequent reuse (less $CaSO_4$ will be formed). The positive effect of minor Mg content has already been cited.

The present embodiment also gives outstanding performances for protection of static SW systems. It then follows that a further application of the treated exhausted SW may be available, e.g., in firefighting systems or in sea-lines protection, as already cited.

The technological advantages of using treated exhausted SW in connection with allowing a different construction material utilization in marine applications, and the relative embodiment, have been cited in the previous section and are intended to be fully reported here.

The environmental advantages of using treated exhausted SW in connection with less pollution, and the relative embodiment, have been cited in the previous section and are intended to be fully reported here.

Effects comparable to those obtained with sodium carbonate can also be obtained with sodium bicarbonate.

Under the present invention, it is then possible to reuse industrial waste waters the waters being characterized by pH>7 and/or by the presence of compounds with corrosion inhibitor and/or antifouling and/or antiscale and/or biocide function as, for example, but not limited to, $Na_2CO_3$ and/or $NaHCO_3$ and/or $Ca(OH)_2$ and/or NaOH and/or Zn and its compounds and/or water soluble organic polymers (e.g. polyacrylates, polyacrylamides) and/or phosphorus compounds and/or chromates and/or nitrates and/or silicates and/or molybdates and/or azoles and/or chlorine and its compounds and/or ammonium salts and/or amines.

Further confirmation of the present invention and its claims is given by reuse, under the present invention, of waste waters from chlorine-caustic plants. Such waters have been reacted with $Na_2CO_3$ and/or $Ca(OH)_2$ and/or NaOH and contain chlorine, besides having a pH>11.

Their reuse falls then under the present invention.

Static Corrosion Tests, performed as previously described (high turbulence, 2500 rpm, T=50°–55 ° C., 12 h, C 1010 carbon steel coupons), have been used to prove the reuse possibility. The remits are brought together in table 17:

TABLE 17

| $Na_2CO_3$ (ppm) | Weight loss (mg) | Deposit weight (mg) | Coupon visual appreciation |
|---|---|---|---|
|  | 12.1 | 10.6 | very slight corrosion, very slight fouling |
| 50 | 2.5 | 3.2 | no corrosion, no fouling |

The key effect of soda ash addition, even at very low dosages, is confirmed again.

It is interesting noting that some waste water compositions under the present invention could be used as they are, without any further treatment.

Addition of $Na_2CO_3$ and/or $Ca(OH)_2$ and/or NaOH and/or $NaHCO_3$ and/or one or more water soluble polymers and/or one or more water soluble phosphonates and/or one or more chemicals capable of preventing corrosion and/or deposits and/or one or more water soluble biocides, under the present invention significantly improves performances.

From the above description it is evident that chemical dosages can be determined, due to the broad field of application of the present invention, from time to time following the type of water, the system to be utilized, and the result to be obtained. Soda ash dosage ranges from 1 to 10,000 ppm, preferably from 1 to 2000 ppm, most preferably from 1 to 1000 ppm. Lime dosage ranges from 1 to 3000 ppm, preferably from 1 to 1000 ppm, most preferably from 1 to 500 ppm.

In another preferred embodiment the present invention provides a process and sorbents for reducing $SO_x$, $NO_x$ and $CO_2$ from a gaseous mixture with greater efficiencies and less environmental impact, at equal costs, in comparison to SW scrubbing or to processes utilizing lime, limestone or magnesium enhanced lime or limestone.

The process is undertaken in apparatuses and operating conditions known to the skilled in the art; likewise, any other means can be added to the process to enhance $SO_x$, $NO_x$ and $CO_2$ removal and/or to limit operating problems. In an example of a pollutant removal process, the gaseous mixture comprising $SO_x$, $NO_x$ and $CO_2$, to be purified, is introduced into an absorption zone, such as a countercurrent gas-liquid contacting zone. The contacting zone may contain contacting means such as trays, packed beds or other contacting devices. The gaseous mixture to be treated by the process of the invention may contain from about 50 to about 50,000 ppm of each $SO_x$, $NO_x$ and $CO_2$ based on the total gaseous mixture to be treated. The $SO_x$, $NO_x$ and $CO_2$ containing gaseous mixture may be derived from any source. This includes smelters, ore roasters, waste treatment processors or incinerators; and coal, peat, shale, tar sand, coke, petroleum crude, or natural gas processing. Fuel treatment, gasification, desulfurization or processing to produce synthetic liquids or solids derived from other fuels are also included.

There have been numerous processes developed to control sulfur emissions including wet scrubbers, spray dryers, fluidized bed combustors, and in-furnace sorbent injection processes (also known as LIMB). One of the most prevalent methods of removing $SO_x$, $NO_x$ and $CO_2$ from effluents has been the wet scrubber.

The novelty of the present invention consists in utilizing waste sludges and/or waters from industrial processes.

For example, sludges produced in the reaction of soda ash and lime with SW, saline, brackish, river, lake, well, waste waters, under the present invention, can be used in such connection. Such sludges, like those coming from chemical softening plants and chlorine-caustic plants, are a waste of the process and their disposal—normally by landfill—is believed to be a heavy problem for their "producer".

A sludge utilization without disposal would be an improvement of today's state of the art.

If, moreover, $SO_x$, $NO_x$ and $CO_2$—and particularly $SO_x$—adsorption efficiency would be greater than that obtained with common commercial sorbents, another improvement of today's state of the art would be realized.

One of the primary limitations of most current $SO_x/NO_x$ control technologies is that they require separate costly equipment and process control measures that occasionally degrade plant performance and reliability. Therefore, there is an important need for a simultaneous $SO_x$ and $NO_x$ control technology that utilizes only one set of equipment.

For the sake of brevity we will analyze the process that uses sludges produced in the reaction of soda ash and lime with SW, saline, brackish, river, lake, well, waste waters.

The present invention permits one to have the advantages of SW scrubbing and of $Mg(OH)_2$ and/or lime and/or limestone system without having their disadvantages. One of the peculiarities of the present invention is that sorbents are not added to SW but are generated from reaction of SW with soda ash/lime and/or are not added as pure/technical grade/commercial products but as an industrial process waste.

Besides the main peculiarity of sorbent sludges source, the present invention differs from SW scrubbing in that there are solid sorbents and differs from lime/limestone/Mg in that there is SW instead of industrial water and there is more Mg in comparison with typical values of Mg enhanced processes (usually around 5% MgO).

An important characteristics of present invention is that slurries are produced in the process or are parts of other processes, and they are a component of these processes, i.e. they are not artificially produced to the precise scope of pollutant abatement. In the present invention, $CaCO_3/Mg(OH)_2$ slurries are indeed "self-produced" during the processes, without "acquiring" them from outside. Moreover, process SW has a pH which allows a higher $SO_2/CO_2$ adsorption and can be disposed without giving rise to local pH lowering. Given sodium and/or nitrogen presence, $NO_x$ adsorption will be achieved too.

In comparison with SW scrubbing present invention has a further positive effect in that $MgCl_2$ and $CaCl_2$, which are not sorbent species and lower limestone reactivity, are converted to $Mg(OH)_2$ and $CaCO_3$—sorbent species. It is noted that $CaCl_2$ is reported as a promoting agent to a limestone slurry, thus increasing $SO_2$ removal efficiency in wet-dry scrubbing of flue gases. The reaction of $CaCl_2$ with $SO_2$ leads to the formation of $Ca(HSO_3)_2$ and, therefore decreases the adverse effects of $CaSO_4$ formation.

Regard to the lime/SW process known in the art, the present invention differs, among the others, in that:

lime is not the sole added chemical and is not added to SW with the purpose of emission abatement;

the sludge and/or waste pans of the processes are utilized, thus realizing a different amount and type of adsorbent medium.

Adding lime to SW simply modifies water pH and type of adsorbent; apart from adding a little Ca, the other sorbent species naturally present in SW are not modified in quantity, but only in type (i.e. if SW has 1300 ppm $Mg^{2+}$, they will remain 1300 ppm). For the purpose of emission abatement, the present invention realizes a different sorbent ratio by adding waste sludges (not lime) to SW or other waters, including waste waters.

The reactions between SW and soda ash/lime have already been described and are intended to be fully reported here. It can be seen that formed sludges are rich in $CaCO_3$ and $Mg(OH)_2$; both compounds are already used in flue gas pollutant adsorption from which follows sludge utilization in such connection.

The present invention enhances $SO_2$ adsorption efficiency, in comparison to the lime process in that the following are present:

—$Mg(OH)_2$ and $CaCO_3$;

higher pH;

chlorides at elevate concentration; and sludge slurry in SW and not in industrial water.

Such slurry is ready to use and its concentration can be varied easily by simple dilution (without any apparatus to weigh lime) to satisfy adsorption needs.

For slurry preparation (and not for wash water for a mist eliminator, as in U.S. Pat. No. 4,8344,955) used blowdown water coming from cooling towers can also be used (including cooling water treated under the present invention) and/or soda ash/lime reacted SW (either coming from cooling towers, under the present invention, or not).

Since the $Mg(OH)_2$ and $MgSO_3$ formed in the SW system react rapidly with $SO_x$, the recirculation rate of the adsorbent slurry through the scrubber can be significantly reduced in comparison to that required by a conventional lime/limestone scrubber.

During precipitation the content of various undesirable substances (e.g. organic carbon, iron, manganese, silicic acid and organic substances of biological origin) is reduced. In the present invention sedimentation or floatation can be helped by use of convenient coagulant or flocculating agents, well known in current technology.

Moreover, according to present invention, the step of sludge dewatering can be then eliminated as it is utilized a "ready to use" slurry, i.e. a sorbent already available in a slurry form.

Moreover, given $Na_2SO_4$ quantity present in the sludge, its "regeneration" with lime can be provided for adsorption purposes, following the reactions:

$$Ca(OH)_2 + Na_2SO_4 \rightarrow CaSO_4 + 2NaOH$$

$$NaOH + SO_2 \rightarrow NaHSO_3$$

in which NaOH is the active sorbent species, like in double alkali system.

The innovation is that $Na_2SO_4$ is obtained directly from SW and is not a synthetic product. Regeneration using lime, that can be accomplished downstream of the reactor-clarifier, produces then a costly product (NaOH) with significant economic saving. The same "regeneration" can be accomplished on SW cooling tower blowdown and/or on soda ash/lime reacted SW, as both contain sufficient soluble $Na_2SO_4$ amounts. When necessary synthetic $Na_2SO_4$ can be added to the system before regeneration with lime. Total sludges can be sent then to scrubber together with SW cooling tower blowdown and/or soda ash/time reacted SW. SW cooling tower blowdown, besides having higher amounts of NaCl, has a higher pH and higher alkalinity in comparison to feed SW, thus favoring $SO_2$ water adsorption reactions completion.

The main reactions which attend the mixture of sludges and SW, concentrated and/or reacted, what $SO_2$ adsorption in the scrubber concerns, are:

$CaCO_3 + SO_2 \rightarrow CaSO_3 + CO_2$
$CaCO_3 + SO_2 + \frac{1}{2}O_2 \rightarrow CaSO_4 + CO_2$
$Mg(OH)_2 + SO_2 \rightarrow MgSO_3 + H_2O$
$Mg(OH)_2 + SO_2 + \frac{1}{2}O_2 \rightarrow MgSO_4 + H_2O$
$Ca(OH)_2 + SO_2 + H_2O \rightarrow CaSO_3 \cdot 2H_2O$
$Ca(OH)_2 + SO_2 + H_2O + \frac{1}{2}O_2 \rightarrow CaSO_4 \cdot 2H_2O$
$Na_2CO_3 + SO_2 \rightarrow Na_2SO_3 + CO_2$
$Na_2CO_3 + SO_2 + H_2O \rightarrow 2NaHSO_3$
$Na_2SO_3 + \frac{1}{2}O_2 \rightarrow Na_2SO_4$
$2NaCl + SO_2 + H_2O + O_2 \rightarrow Na_2SO_4 + 2HCl$.

Formed $Na_2SO_4$ has a lower ash resistivity and it is then easy to recover in electrostatic precipitators; it falls in the first fields, which aids in separating it from other ashes—that is important for recovering it. Recovered $Na_2SO_4$ can be added to the sludge before regeneration with lime.

Sludges from SW reaction with soda ash and lime, under the present invention, have the examplary characteristics listed in table 18:

TABLE 18

| Parameter | SW + 1500 ppm $Na_2CO_3$ + 500 ppm $Ca(OH)_2$ | SW + 1000 ppm $Na_2CO_3$ + 500 ppm $Ca(OH)_2$ |
|---|---|---|
| Ca (% CaO) | 33.9 | 32.7 |
| Mg (% MgO) | 13.5 | 13.4 |
| Carbonates (%) | 21 | 20 |
| Na (% $Na_2O$) | 8.2 | 7.6 |
| Silica (%) | 1.1 | 1 |
| Chlorides (% NaCl) | 5.1 | 5.1 |

On average, treating SW with 1000 ppm soda ash and 500 ppm lime gives rise to a sludge quantity of minimum 1.2 grams/liter; treating SW with 1500 ppm soda ash and 500 ppm lime the sludge quantity is at a minimum of 1.6 grams/liter. If the present invention is applied to SW cooling tower with make-up water of 200 $m^3$/h, it will mean to obtain minimum 240 Kg/h sludge, which contains about 140 Kg/h $CaCO_3$ and about 40 Kg/h $Mg(OH)_2$ (without differentiating other Mg compounds). After treatment, e.g. with 1000 ppm soda ash and 500 ppm lime, make-up SW will have approximately 700 ppm calcium hardness and 4200 ppm magnesium hardness (both as ppm $CaCO_3$), which twice concentrated will give a blowdown of 100 $m^3$/h with 1400 ppm calcium hardness and 8400 ppm magnesium hardness, 70,000 ppm chorides (and chlorides increase $SO_2$ adsorption) and pH 8.5–9.

A slight alkalinization, that can be realized by adding e.g. with soda ash and/or lime and/or caustic, will allow an increased pH at values >10 and precipitation mostly of Mg as $Mg(OH)_2$. For such purpose, e.g. with 1000 ppm soda ash and 500 ppm lime treated SW, about 400 ppm NaOH is enough. Separated $Mg(OH)_2$ will be recycled for primary soda ash treatment and/or to the caustic treatment (alkalinization step) to increase sludge quantity—such compound has a "seed" function and $Mg(OH)_2$ percentage in the sludge will increase. The described post-alkalinization gives rise, e.g. with 1000 ppm soda ash and 500 ppm lime treated SW, to a roughly 1000 ppm $Mg(OH)_2$ and 300 ppm Ca abatement (both as $CaCO_3$), that is a precipitation (for a 200 $m^3$/h volume) of roughly 120 Kg/h $Mg(OH)_2$ and 60 Kg/h $CaCO_3$, which will be added to soda ash/lime treatment sludge; all the sludge will be sent to the scrubber. In the case of the twice concentrated SW, previously treated with 1000 ppm soda ash and 500 ppm lime, the described post-alkalinization gives rise to a roughly 1100 ppm $Mg(OH)_2$ and 900 ppm Ca abatement (both as $CaCO_3$), that is a precipitation (for a 100 $m^3$/h volume) of roughly 65 Kg/h $Mg(OH)_2$ and 90 Kg/h $CaCO_3$. In alternative of the above, sludges from soda ash/lime treatment and those from post-alkalinization can be fed to an adsorption tower which has downstream a scrubber fed with alkalinized blowdown water, once the sludge has been separated; another possible configuration is that in which prescrubber is fed with alkalinized blowdown water and sludges are fed in the scrubber.

SW treated with soda ash/lime and/or post-alkalinized will have a minor sulfate content, that sludge recycle will further lower: this will limit sulfate deposition in the apparatuses.

Given the elevated NaCl content in SW, specially in the twice concentrated one, ammonia addition will increase $SO_2$ abatement efficiency following the reaction:

$$2NaCl + SO_2 + 2NH_3 + H_2O \rightarrow Na_2SO_3 + 2NH_4Cl$$

which reaches equilibrium at 60° C. $Na_2SO_3$ is also obtained, which is a sorbent species, from which follows a further increase in SO$_2$ abatement efficiency. Such embodiment will be discussed after. NaCl, moreover, markedly improves the desulfurization properties of limestone because it favors the formation of a type of CaO with a suitable porous texture. In this way, both the degree of conversion of CaO to CaSO$_4$ and the speed of the sulfurization process are increased. In addition, this effect proves to be greatest when the temperature is about 850° C. (the standard temperature used in fluidized bed desulfurization). KCl behaves in a similar way to NaCl.

The process for SO$_2$ adsorption, under the present invention, can also be utilized with well, river, take, saline, brackish, waste waters and mixtures thereof, but in these cases sorbents production will be lower.

Given the process peculiarities, it would be possible to create partnerships where industries could treat SW for cooling and send flue gases to a common desulfurization unit fed with treatment sludges, eventually conveniently treated, and with towers blowdowns (that could eventually feed the prescrubber). Alternatively, electric power stations could treat huge SW volumes, send it to industries for cooling (or eventually utilize it for limiting corrosion, scale, fouling, biofouling problems in the condensers), and utilize produced sludges for a desulfurization unit. Cooling water and/or sludges will be then at very low costs, when not remunerative.

For example, a 320 MW power station that burns 70 ton/h fuel oil with 3% sulfur content will utilize 6.55 ton/h limestone, with a current cost of about 230 $/h. At same cost it is currently possible to treat 750 m$^3$/h SW (with 1000 ppm soda ash and 500 ppm lime) gaining minimum 900 Kg/h sludge or to treat 530 m$^3$/h SW (with 1500 ppm soda ash and 500 ppm lime) gaining minimum 850 Kg/h sludge.

Currently, the lime or limestone slurry (prepared after sorbent grinding and having a solid content of 15-20%) is prepared utilizing industrial water.

In a further preferred embodiment the present invention provides a process to prepare a slurry which eliminates the necessity of grinding and slurry tankage apparatuses as well as eliminating sludge dewatering needs.

It is well known that lime/limestone are more reactive when finely ground: in the present invention we obtain directly a "reaction" slurry in which sorbents are in a "molecular" state, dispersed in water, i.e. in a less aggregate state, and Na$_2$SO$_4$ presence renders the sludge flocculent and then better in terms of adsorbent surface. In such connection, it is possible to add to the slurry a convenient "gelifying" agent, of the type of water soluble polymer, e.g. polyacrylamides, polyacrylates, for specific surface increase. To our knowledge, such procedure is not adopted in commercial desulfurization units and could be successfully applied in current operation.

In another embodiment, the present invention provides a process which eliminates the need of low hardness water and the dosed loop operation, allowing water disposal in the sea without particular problems.

The effluent from scrubbing, under the present invention, is nontoxic (a completely oxidized reaction product is produced) to aquatic life and can be returned to the sea, e.g. with spent cooling water, without treatment or environmental hazards, thus eliminating liquid and solid waste disposal problems (the very fine gypsum crystals are partially or completely dissolved in the SW).

Sodium presence (injected as NaHCO$_3$ and/or Na$_2$CO$_3$ and/or NaOH) and the massive presence of NaCl is reported to abate more than 40% NO$_x$ emissions, besides having a significant effect on SO$_x$ emissions abatement. As already seen, sludge coming from soda ash/lime SW treatment contains about 8% Na; a higher Na extent will be contained in the sludge coming from chlorine-caustic plants. Both sludges contribute then "intrinsically" to NO$_x$ abatement.

Utilizing the slurry sorbent of SW (or well, river, lake, saline, brackish, waste waters and mixtures thereof) and/or wastes under the present invention, sorbent concentration can be lower (in comparison to 15-20% of limestone in industrial water) and/or the operation can be at lower L/G ratios, particularly if ammonia is added to the slurry.

Tower blowdown water utilization and SW blowdown will allow desulfurization unit water saving (approximately 0.12 $/m$^3$, with volumes of about 1 m$^3$/h for each MW produced); due to lower L/G ratios an electric power saving will also arise. An eventual major cost for obtaining the equivalent sludge quantity for the same SO$_x$ abatement will be well compensated from major cooling SW production (for sale). A big saving will result in that commercial sorbents are not acquired or acquired in a minimum amount (depending on emission target, on SW production, on wastes available, etc.), using the sorbents under the present invention.

In another preferred embodiment the present invention provides a process in which ammonia is added to SW or industrial waste waters and/or brines and/or sludges from SW reaction or waste sludges, under the present invention. We have already seen the reaction:

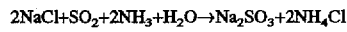

$$2NaCl+SO_2+2NH_3+H_2O \rightarrow Na_2SO_3+2NH_4Cl$$

Such reaction can be directly utilized for SO$_2$ adsorption, using as sorbent an NaCl brine and injecting ammonia. Such brine can be obtained e.g. from dissolution of a NaCl mineral or as industrial waste. Also, concentrated brine of SW evaporators in SW desalination plants could be utilized. Ammonia can also be added in the sludge, better in the mixture SW+ sludge, obtained from SW/soda ash/lime reaction under the present invention; in such connection SW in the mixture can be added as it is and/or treated and/or concentrated. In the same connection, ammonia can be injected in the sludge from chlorine-caustic plants, in admixture or not with SW.

It is known that chlorides present in the slurry can lower up to 30% lime consumption in spray-adsorbers; in fact, the catalytic action of NaCl on SO$_2$ capture by lime/limestone-based sorbents has been reported.

In such connection ammonia, added to SW or to brines, can be directly utilized for SO$_2$ adsorption or can be injected together with lime and/or limestone and/or Mg compounds.

To our knowledge, ammonia addition in such connections is not reported in the state of the art and must be regarded as an innovation of current technology.

In a further embodiment, the present invention provides new sludge (i.e. sorbents) and/or process water source.

For the purposes of the present invention, another sludge and/or treated SW source comes from Mg/MgO production plants. Such water (hereinafter referred to as exhausted SW) is in fact characterized from high pH (>11) and from nonreacted lime and/or NaOH; therefore it possesses a higher adsorption capacity in comparison to SW. Currently exhausted SW is disposed in the sea after pH correction with acid or with large volumes SW; disposal bears costs.

Exhausted SW utilization as process water for SO$_x$, NO$_x$, CO$_2$ adsorption, either in the scrubber or in slurry preparation, to our knowledge, has never been proposed and is therefore an improvement of today's state of the art. The same for sludges from Mg/MgO production plants, which contain—after Mg(OH)$_2$ separation—lime, calcite, aragonite, gypsum, quartz, SiC and graphite (a sorbent species too).

In this embodiment, the present invention also provides a process for eliminating acid pH correction and/or SW dilution of exhausted SW.

For the purposes of the present invention, another sludge and/or process water source comes from chlorine-caustic plants and/or softeners, included chemical softening and softeners brines.

For example, in chlorine-caustic plants input NaCl minerals are first purified by precipitation of impurities as $CaCO_3$ and $Mg(OH)_2$; for such purpose $Na_2CO_3$ and $Ca(OH)_2$ are added to NaCl brine. All precipitated sludges, together with post-precipitated ones (stopped in bag filters), are dryed and then disposed. Due to high $CaCO_3$ and $Mg(OH)_2$ content, this waste is under the scope of the present invention. Supposing an average value of 1% impurities and at least 1% of reagents, total sludge produced is about 2% of plant feedstock; it is evident the improvement in both environmental and economic terms introduced with the present invention. To give a figure, a plant processing 1,000,000 ton/year will produce 20,000 ton solids; an average desulfurization unit needs about 20,000–30,000 ton sorbents/year.

Other suitable sorbent, under the present invention, is $Ca(OH)_2$-containing paste from $CaC_2$ manufacture.

Another interesting application of the present invention consists in the utilization of Sour Water Stripper (SWS) plants feedwater. SWS plants are normally petroleum refinery plants in which sour waters, containing huge amounts of $H_2S$ and $NH_3$, of various plants (e.g. Topping, Vacuum, FCCU, Visbreaking, Thermal Cracking, Coking, HDS, Reforming, etc.) are steam stripped to abate contaminant content. Feedwater may contain from 100 to 40,000 ppm of $H_2S$ and $NH_3$ each, that are reduced up to 1–2 ppm at plant exit. Steam requirement is high and ranges from 0.1 to 0.6 ton/feed ton. Due to high ammonia content, SWS feedwater could be utilized as process water for desulfurization plants, where $NH_3$ would adsorb $SO_x/NO_x/CO_2$, thus reducing its content (the refinery purpose) and at the same time reducing flue gas emissions (the FGD purpose). Moreover, $H_2S$ through the formation of aqueous $Na_2S$ solution, improves $NO_x$ removal; it follows than that $H_2S$ content will be reduced too. SWS feedwater could be then an ideal scrubber feedwater, realizing a major improvement in both $SO_x/NO_x/CO_2$ removal and environmental and economic impact.

In this way, SWS plant could eventually be by-passed from the refinery process scheme, this resulting in a significant saving for both the refinery and desulfurization operation. An average refinery has an SWS feedwater volume of about 100 m³/h with an average content of 5000 ppm $NH_3$ and 10,000 ppm $H_2S$; steam requirement ranges from 18 to 20 ton/h. Adding such water to a FGD unit will be equivalent to adding 500 Kg/h $NH_3$ and 1000 Kg/h $H_2S$. The approximate saving for the desulfurization unit could be minimum 1,250,000 $/year (in terms of minor sorbents and water needs), and the refinery would save plant costs (construction costs, capital costs, personnel, utilities, etc.).

Compatibly to FGD operational problems, other waste treatment plants could be eventually by-passed to the scope of supplying wastes under the present invention.

Another source of sorbent and/or process water could be, as cited, SW desalination plants brines—included e.g. reverse osmosis plants, distillation plants, ion exchange plants, electrodialysis plants, etc.-, such brine being an incomparable source of e.g. NaCl, $CaCO_3$, $Na_2SO_4$, $MgSO_4$, $Mg(OH)_2$.

Another source of sorbent could be waste flue/off gases from petroleum refineries. Such gases contain from 30 to 60% methane or propane, with volumes of roughly 1 ton/h for a medium refinery. Still another source of sorbent could be waste ammonia from coke-oven gas.

Under the present invention, it is then possible to use as sorbents, sludges and/or wastes and/or waters and/or gases arising from any industrial process, such sludges and/or wastes and/or waters and/or gases being characterized by high pH (>7) and/or sorbent compounds present, like, e.g., $CaCO_3$ and/or CaO and/or $Ca(OH)_2$ and/or $Na_2SO_3$ and/or $Na_2SO_4$ and/or NaOH and/or NaCl and/or $Na_2CO_3$ and/or $K_2CO_3$ and/or MgO and/or $MgSO_4$ and/or $Mg(OH)_2$ and/or $NH_3$ and/or urea and/or amines and/or citric acid and/or CuO or other metal oxides and/or $CH_4$ and/or sulfonic acids and/or $H_2S$ and/or fly ash and/or formic acid.

As cited, the sorbents under the present invention can be supplemented, when necessary, with convenient amounts of other sorbents; this amount will be sufficient to reduce $SO_x/NO_x/CO_2$ in the effluent stream and to reach a convenient pollutant adsorption efficiency.

In addition, other additives may be used in the slurry phase. These can be classified as additives that 1) change the physical properties of the resulting hydrated sorbent material or 2) change the physical properties and remain present in the final material. Besides these, other suitable process additives can be added. EPA 376,485 discloses compositions used to inhibit $SO_3^=$ oxidation to $SO_4^=$ in scrubbing solutions containing lime, limestone, NaOH, or $K_2CO_3$ used for removing $SO_2$ from gases.

Given high scrubber water pH, under the present invention, a significant mount of $CO_2$ will be adsorbed, thus obtaining a water with on specification pH.

The process under the present invention is particularly useful (eventually by adding SW to increase circulating water volume) in Circulating Fluidized Bed desulfurization units.

The process under the present invention allows the same advantages of Mg enhanced lime/limestone process using wastes as sorbents, thus at zero cost; at the same time waste disposal problems are solved.

The process under the present invention allows HCl and HF adsorption too.

To comparatively quantify the present invention process and existing technologies, laboratory tests were performed. For such purpose, pure $SO_2$ has been continuously bubbled, at a temperature of about 23° C. and at a constant flow, in a reaction vessel containing the sorbents specified hereinafter. By a gas-chromatograph it has been determined the amount of $SO_2$ at the reaction vessel exit and, the $SO_2$ amount removed by the sorbent. In the following table 19 are reported some of the results obtained, that are to be read with the following legend:

WW=well water as in table 10

SW=seawater as in table 7

SW1=seawater as in table 7+1000 ppm $Na_2CO_3$+500 ppm $Ca(OH)_2$

SW2=SW1 twice concentrated

SWE=exhausted SW (pH=11, P=120, M=150, CaH=5820, MgH=430)

Mix=sludge obtained from SW1

CS=total sludges from chlorine-caustic plant $NH_3$=$NH_3$ solution at 25% concentration Tests with WW were performed to compare present invention with current technologies making use of industrial water. The results are listed in table 19:

TABLE 19

| Sorbent | Removed SO$_2$ (grams) |
| --- | --- |
| 200 ml WW | 2.42 |
| 10 g Ca(OH)$_2$ + 200 ml WW | 10.98 |
| 5 g Ca(OH)$_2$ + 200 ml WW | 7.40 |
| 4.5 g Ca(OH)$_2$ + 0.5 g MgO + 200 ml WW | 7.67 |
| 5 g Mix + 200 ml WW | 7.45 |
| 5 g CS + 200 ml WW | 7.43 |
| 5 g CaCO$_3$ + 200 ml WW | 7.15 |
| 1 g CS + 4 g Mix + 200 ml WW | 7.43 |
| 4 g CaCO$_3$ + 1 g Mix + 200 ml WW | 7.04 |
| 4.5 g CaCO$_3$ + 0.5 g MgO + 200 ml WW | 8.16 |
| 200 ml SW | 2.90 |
| 4.5 g CaCO$_3$ + 0.5 g Mix ml SW | 8.78 |
| 5 g Mix + 2 ml NH$_3$ + 200 ml SW | 8.38 |
| 4.5 g CaCO$_3$ + 0.5 g Mix + 2 ml NH$_3$ + 200 ml SW | 9.14 |
| 5 g CS + 200 ml SW | 8.84 |
| 200 ml SW | 3.14 |
| 2 ml NH$_3$ + 200 ml SW1 | 4.00 |
| 5 g Mix + 200 ml SW1 | 8.15 |
| 5 g Mix + 2 ml NH$_3$ + 200 ml SW1 | 7.86 |
| 4.5 g CaCO$_3$ + 0.5 g Mix + 2 ml NH$_3$ + 200 ml SW1 | 9.11 |
| 5 g CS + 2 ml NH$_3$ + 200 ml SW | 7.62 |
| 200 ml SW2 | 3.24 |
| 2 ml NH$_3$ + 200 ml SW2 | 4.40 |
| 5 g Mix + 200 ml SW2 | 8.47 |
| 4.5 g CaCO$_3$ + 0.5 g Mix + 200 ml SW2 | 7.95 |
| 5 g Mix + 2 ml NH$_3$ + 200 ml SW2 | 11.21 |
| 4.5 g CaCO$_3$ + 0.5 g Mix + 2 ml NH$_3$ + 200 ml SW2 | 11.45 |
| 5 g CS + 200 ml SW2 | 7.65 |
| 5 g CS + 2 ml NH$_3$ + 200 ml SW2 | 8.00 |
| 200 ml SWE | 3.00 |
| 5 g Ca(OH)$_2$ + 200 ml SWE | 8.10 |

Within experimental error limits, the NH$_3$ effect is evident, especially in SW,SW1,SW2,SWE, even at very low dosages in comparison to NaCl content. Mix and CS performance is evident in comparison to both Ca(OH)$_2$ and CaCO$_3$. Moreover, both Mix and CS can be added to current common sorbents with positive effects. It can be seen that sorbents under the present invention can be equivalent to more than double the lime dosage. The above results are to be intended as minimum performance in that the effect of regeneration and/or alkalinization was not fully evaluated. Keeping well in mind the above described advantages of the present invention enhanced limestone reactivity as a function of Mg$^{2+}$ and NaCl presence also contributes to the performance.

In another preferred embodiment the present invention provides a desulfurization process that gives rise to no or slight solid formation. In fact, in some tests no solid formation has been noted: in general, Mix gives rise to no or very slight solid formation. In other tests only slight solid formation has been noted: in general, CS gives rise to slight solid formation. Adding ammonia gives rise, specially with CS, to a flocculent solid, probably due to ammonium chloride formation. Such characteristic enforces the environmental peculiarities of the present invention. When sludges arise they can be used in structural fill, cement replacement, stabilized road base, synthetic aggregate, soil stabilization, light weight aggregate, sludge stabilization, brick manufacture, mineral wool manufacture and agricultural uses; alternatively they can be landfilled.

From the above description, it is evident that sorbent to SO$_x$ or to NO$_x$ ratio cannot be defined in a range, such ratio depending on the intrinsic (e.g. chemical composition) characteristics of the waste stream used, that, as seen, can be of various sources and in various amounts. The best way to control and/or predict performances for a certain FGD plant with a certain "waste slate" appears to run a complete chemical analysis of the feed waste and determine a theoretical waste to flue gas ratio based on the components found and the theoretical ratios used for such compounds. Bench scale laboratory tests could be run afterwards to find the best operating ratio.

Wastes equalization can be performed to ensure an approximate constant sorbents ratio. When sorbents under present invention are not sufficient to ensure an adequate emission control they can be supplemented with "classic" sorbent species.

The above described sorbents can be utilized in a dry process application by adding to the process the following steps:

dewatering the slurry;

injecting the dry slurry in the combustion chamber of a boiler or in the process generating the pollutants.

Following is an exemplary application of present invention for the dry process. The sorbent material will be introduced into the gas stream, where the gas stream is at a temperature of at least about 200° C. and preferably about 700° C., more preferably about 870° C. and generally not exceeding 1300° C., usually not exceeding 1000° C. In the lower region of the temperature range, usually other additives will be present for enhancing removal of SO$_x$ and NO$_x$. Additives which may be employed include catalysts, such as titanium oxide and vanadium pentoxide on an aluminum support, which aids in the removal of NO$_x$. In the middle region of temperature, e.g. about 700° C., an ancillary organic reductant, particularly a polyol, e.g. a carbohydrate, may be present as part of the sorbent material or added concurrently. The polyol should be oxidizable at temperatures of less than about 815° C. and will for the most part be carbohydrates of from 6 to 12 carbon atoms, particularly fructose, glucose and sucrose, possibly present from a waste source. The effluent should have at least 0.1% volume oxygen and not more than about 20% volume oxygen, preferably having from about 0.1–10% volume oxygen. The pressure in which the removal process is carried out is not critical and may vary widely, generally from about 0.1 to 100 atm. The residence time for the reaction will generally range from about 0.001 to 10 sec. The material which is injected into the stream may be as fine powder, slurred as a fine spray or molten as a fine spray. Various techniques can be employed for introducing the sorbent material, including high pressure nozzles, pneumatic gas injection, either air or combustion product gas, rotary atomizers, etc. The sorbent material may be introduced into the effluent stream in finely divided form as a dry powder or aqueous slurry droplets. The sorbent is injected into the effluent stream so as to provide a substantially uniform distribution of the material in the effluent stream. The sorbent particles will generally be of a size in the range of about 0.5μ to 20μ, where the wet sorbent drop sizes of the slurry will usually be from about 10μ to 750μ. The droplets will usually have less than 50% weight free (uncomplexed) water. Typically, the injection for SO$_x$ removal will be at a rate such that the Ca/S or Ca+Mg/S molar ratio is in the range of 0.1–5, preferably 1–3.

It will be obvious to one skilled in the art that the proportions in all the above description of present invention will be more or less dependent upon the constituents of used waters, sludges and gaseous mixtures. The present invention will be, therefore, not limited to any specific proportions thereof, although the same should be substantially within the ranges above mentioned for best results.

While the illustrative embodiments of the invention have been described with particularity, it will be understood that various other modifications will be apparent to and can be readily made by those skilled in the art without departing from the spirit and the scope of the invention. Accordingly, it is not intended that the scope of the claims appended hereto be limited to the examples and descriptions set forth hereinabove but rather that the claims be construed as encompassing all features of patentable novelty which reside in the present invention, including all features which would be treated as equivalent thereof by those skilled in the art to which the invention pertains.

We claim:

1. A process for treating wastes comprising the steps of:
   producing a waste sludge containing calcium carbonate and magnesium hydroxide by reaction of soda ash and lime with process water;
   feeding a hot waste gas at a temperature of from about 200° C. to 1000° C. containing 50 to 50000 ppm of pollutants selected from the group consisting of $SO_x$, $NO_x$ and $CO_2$ to a scrubber apparatus containing an adsorbent slurry comprising said waste sludge for removing $SO_x$, $NO_x$ and $CO_2$;
   separating the waste sludge to obtain a dry sludge;
   injecting the dry sludge into a reaction chamber; reacting a gaseous stream containing said pollutants in the reaction chamber with said dry sludge to substantially reduce sulfur oxide compounds and nitrogen oxides in said reaction chamber.

2. The process according to claim 1 where the waste sludge is derived from waste water.

3. The process according to claim 1 where the reaction chamber comprises a boiler.

4. The process according to claim 3 further comprising the step of adding ammonia to the pollutants in the scrubber.

5. The process according to claim 1 where the waste sludge has a pH>7.

6. The process according to claim 5 further comprising the step of adding additive compounds selected from the group consisting of corrosion inhibitors, antifouling agents, antiscaling agents, and biocide agents.

7. The process according to claim 6 where said additive compounds include $Na_2CO_3$, $NaHCO_3$, $Ca(OH)_2$, NaOH, Zn, water soluble organic polymers, phosphorus compounds, chromates, nitrates, silicates, molybdates, azoles, chlorinated compounds, ammonium salts and amines.

8. The process according to claim 7 further including the step of adding to the reaction chamber a sorbent compound selected from the group consisting of $CaCO_3$, CaO, $Ca(OH)_2$, $Na_2SO_3$, NaOH, NaCl, $Na_2CO_3$, $K_2CO_3$ MgO, $MgSO_4$, and $Mg(OH)_2$.

9. The process according to claim 7 where the water soluble polymers are selected from the group consisting of polyacrylates and polyacrylamides.

10. The process according to claim 1 further including the step of alkalinizing the waste sludge with a compound selected from the group consisting of $Na_2CO_3$, $NaHCO_3$, $Ca(OH)_2$, NaOH and $NH_3$.

11. The process according to claim 10 further including the step of adding lime to regenerate $Na_2SO_4$ and NaOH from the waste sludge.

12. A method for treating wastes comprising the steps of:
    producing a waste sludge containing calcium carbonate and magnesium hydroxide by reaction of soda ash and lime with process water;
    feeding the waste sludge to a scrubber with a waste gas mixture containing gaseous pollutants where said gaseous pollutants are in a mixture comprising 50 ppm to 50000 ppm each of $SO_x$, $NO_x$ and $CO_2$;
    separating the waste sludge to obtain a dry sludge;
    injecting the dry sludge into a reaction chamber;
    reacting a gaseous stream containing said gaseous pollutants in the reaction chamber with said sludge to substantially reduce sulfur oxide compounds and nitrogen oxides in said reaction chamber.

13. The method of claim 12 where the reaction chamber comprises a boiler and the waste sludge is introduced in the gaseous stream at a temperature from 200° C. to 1300° C.

14. The method of claim 12 where the waste sludge has a pH>7.

15. The method of claim 14 further comprising the step of injecting into said waste sludge additive compounds selected from the group consisting of corrosion inhibitors, antifouling agents, antiscaling agents, and biocide agents.

16. The method according to claim 15 where said additive compounds include $Na_2CO_3$, $NaHCO_3$, $Ca(OH)_2$, NaOH, Zn, water soluble organic polymers, phosphorus compounds, chromates, nitrates, silicates, molybdates, azoles, chlorinated compounds, ammonium salts and amines.

17. The method according to claim 16 where the water soluble polymers are selected from the group consisting of polyacrylates and polyacrylamides.

18. The method according to claim 14 further including the step of adding to the reaction chamber a sorbent compound selected from the group consisting of $CaCO_3$, CaO, $Ca(OH)_2$, $Na_2SO_3$, NaOH, NaCl, $Na_2CO_2$, $NaCO_3$, $K_2CO_3$ MgO, $MgCO_2$, and $Mg(OH)_2$.

19. The method according to claim 14 further comprising the step of adding ammonia into the scrubber.

* * * * *